United States Patent [19]
Takaoka et al.

[11] Patent Number: 5,482,128
[45] Date of Patent: Jan. 9, 1996

[54] POWER STEERING APPARATUS

[75] Inventors: Manabu Takaoka, Kitakatsuragi; Masayuki Watanabe, Uji, both of Japan

[73] Assignee: Koyo Seiko Co., Ltd., Osaka, Japan

[21] Appl. No.: 350,947

[22] Filed: Dec. 7, 1994

[30] Foreign Application Priority Data

| Dec. 7, 1993 | [JP] | Japan | 6-017485 |
| Dec. 7, 1993 | [JP] | Japan | 5-306583 |
| Feb. 14, 1994 | [JP] | Japan | 5-327933 |

[51] Int. Cl.⁶ .................................................. B62D 5/04
[52] U.S. Cl. .......................... 180/79.1; 464/45; 464/35
[58] Field of Search .................... 180/79.1, 79, 149, 180/151; 464/30, 34, 35, 41, 42, 45, 182; 74/388 PS, 412 TA, 724, 406

[56] References Cited

U.S. PATENT DOCUMENTS

| 3,203,268 | 8/1965 | Manone et al. | 74/411 |
| 4,880,407 | 11/1989 | Carton-Bacon | 464/43 |
| 4,910,443 | 3/1990 | Zylstra et al. | 318/294 |
| 5,016,740 | 5/1991 | Ito et al. | 180/79.1 |
| 5,213,173 | 5/1993 | Konishi et al. | 74/388 PS |

FOREIGN PATENT DOCUMENTS

| 0266531 | 5/1988 | European Pat. Off. | |
| 0535422 | 4/1993 | European Pat. Off. | |
| 3123284 | 12/1982 | Germany | |
| 1009062 | 1/1989 | Japan | 180/79.1 |
| 1172058 | 7/1989 | Japan | 180/79.1 |
| 2-15576 | 1/1990 | Japan | |
| 2-120178 | 5/1990 | Japan | |
| WO90/12966 | 11/1990 | WIPO | |

*Primary Examiner*—Kevin T. Hurley
*Attorney, Agent, or Firm*—Darby & Darby

[57] ABSTRACT

A lock nut having a tapered portion at one end thereof is screwed halfway through an output shaft that transfers motion to a steering mechanism. A tapered fitting hole formed through an axis of a worm wheel is fitted onto an outer circumference of the tapered portion with a slip plate interposed therebetween. By tightening the lock nut, the worm wheel is pressed and fixed to a support portion formed on a portion of the output shaft, and a worm directly connected to an output side of a steering assisting electric motor is made to engage with a gear formed on the outer circumference of the worm wheel. In normal operation, the torque of the electric motor is transmitted to the worm wheel via the worm, and further on to the output shaft via friction on the slip plate. Upon application of an excessive rotational torque in the event of a motor lock, slippage occurs on the slip plate to allow free rotation of the output shaft.

13 Claims, 17 Drawing Sheets

POWER STEERING APPARATUS

BACKGROUND OF THE INVENTION

1. Field of the Invention

The present invention relates to an electric power steering apparatus that uses an electric motor as an auxiliary power source for steering, and more particularly to a power steering apparatus in which the torque of the electric motor is transmitted to a steering mechanism via a worm gear-type reduction mechanism.

2. Description of Related Art

A power steering apparatus is provided to apply steering assisting power to the steering mechanism in accordance with the steering torque applied at the steering wheel, thereby reducing the effort required to steer the road wheels and thus achieving a comfortable steering feel. In recent years, power steering apparatus have come to be used widely not only in large vehicles such as buses and trucks but also in smaller vehicles such as standard-sized passenger cars, mini cars, etc.

Power steering apparatus for this application are largely classified into two types according to the steering assisting power source used: the hydraulic type that uses a hydraulic actuator such as a hydraulic cylinder; and the electric type that uses an electric motor. The electric-type power steering apparatus is constructed to provide steering assisting power by driving a steering assisting electric motor installed midway through a steering mechanism in accordance with the result of the detection of the steering torque applied at the steering wheel, and by applying the torque of the motor to the steering mechanism. The use of this type of power steering apparatus has been increasing recently because of the advantage that the steering assisting power characteristics can be easily changed by controlling the energization of the electric motor according to driving conditions such as vehicle speed, steering frequency, etc.

One problem with the electric power steering apparatus has been the difficulty in obtaining a compact electric motor capable of providing sufficient torque for steering assisting power, coupled with the difficulty in securing space in a vehicle for installation of such a motor. This problem, however, has been solved by installing a reduction mechanism midway through a steering power transmission system coupling from the power assisting motor to the steering mechanism to reduce the motor speed thereby increasing the motor torque for transmission to the steering mechanism. The reduction mechanism is required to be constructed compact in size to reduce the overall size of the transmission system, while providing a high reduction ratio. To meet this requirement, a worm gear-type reduction mechanism is widely used which has a worm connected to the output side of the steering assisting electric motor, and a worm wheel that engages with the worm and is fitted onto the output shaft connected to the steering mechanism.

Another problem with the electric power steering apparatus is that if the power assisting motor is locked, the steering mechanism coupled to the output side of the motor via the reduction mechanism is thrown into a locked condition, losing steering maneuverability. Accordingly, safety measures to prevent the occurrence of steering maneuverability loss are essential. To achieve this, it has been widely practiced to interpose an electromagnetic clutch between the steering assisting motor and the reduction mechanism, the electromagnetic clutch being shut off in the event of a motor lock to disengage the motor from the steering mechanism.

The power steering apparatus of the above construction, however, has the disadvantage that the interposition of the electromagnetic clutch prevents the reduction of the overall size of the transmission system that may be achieved by the reduction in size of the motor and the reduction mechanism. To overcome this disadvantage, Japanese Patent Application Laid-Open No. 2-120178 (1990) and Japanese Utility Model Application Laid-Open No. 2-15576 (1990) disclose power steering apparatus in which a mechanical torque limiter, designed to cause slippage upon the application of an excessive rotational torque and thereby disengage the coupling between the steering assisting motor and the steering mechanism, is provided in the reduction mechanism between the motor and the steering mechanism, thereby preventing the occurrence of steering maneuverability loss caused by a motor lock without using an electromagnetic clutch.

According to the construction disclosed in the former patent publication number, one of the gear wheels forming the reduction mechanism is fitted in freely rotatable fashion on a support shaft, and a plurality of clutch plates whose rotation is restricted by the gear wheel and the support shaft, respectively, are alternately mounted one behind another inside the gear wheel, the gear wheel being allowed to rotate freely upon the application of a rotational torque that exceeds the friction engagement torque between these clutch plates. This construction, however, merely replaces the electromagnetic clutch by a friction clutch, and requires the provision of a special gear wheel having an internal construction too complex for general use.

On the other hand, the power steering apparatus disclosed in the latter patent publication number employs a simple construction; that is, while one of the gear wheels forming the reduction mechanism is fitted in freely rotatable fashion on a support shaft, as in the former case, one side face of this gear wheel is pressed by a pressure spring to press the other side face against a step formed on the support shaft, with a friction plate interposed between the pressing face and the face pressed by the pressure spring, allowing the gear wheel to rotate freely with the friction plate being caused to slip upon the application of an excessive rotational torque.

In the latter construction, however, the free rotation of the gear wheel is accompanied by slippage on the fitting face on the support shaft, and since this slippage is dependent on the fitting gap between the two parts, the fitting portions of the gear wheel and support shaft require high machining accuracy to ensure a reliable operation as a torque limiter, the resulting problem being an increase in the number of machining steps. The dependence of the slippage on the fitting face can be eliminated by presetting the fitting gap on the larger side, but this gives rise to the problem that the gear wheel is caused to rotate with radial displacement, adversely affecting the engaging condition on its outer circumference with other gear wheels and thus preventing proper torque transmission that the gear wheel is supposed to carry out.

Furthermore, the latter construction is specifically designed for application to spur gears, and if the same construction is applied to the worm wheel in the earlier described worm gear-type reduction mechanism, there is a possibility that, because of the axial force acting on the engaging face with the worm, the worm wheel may be displaced in axial direction against the urging force of the pressure spring, making it impossible to maintain proper engagement with the worm. Moreover, since the spring force of the pressure spring varies under the influence of the axial force, it is difficult to precisely set the upper limit torque above which the worm wheel is allowed to rotate freely; the resulting problem is that free rotation of the worm wheel may occur when the power steering apparatus is operating normally, resulting in a loss of proper steering assisting power and thus causing a sudden change in the steering feel. Further, there is a possibility that the worm wheel may not be placed in a freely rotatable condition in time in the event of a motor lock, causing a safety problem such as the occurrence of steering maneuverability loss in transition.

Summary of the Invention

One object of the invention is to provide a power steering apparatus in which a torque limiter of simple construction, used to disengage the coupling between the power assisting motor and the steering mechanism upon the application of an excessive rotational torque, is realized without causing axial displacement of the worm wheel, and which is capable of contributing to the reduction in size of the transmission system coupling from the power assisting motor to the steering mechanism.

Another object of the invention is to provide a power steering apparatus in which a torque limiter of simple construction, used to disengage the coupling between the power assisting motor and the steering mechanism upon the application of an excessive rotational torque, is realized without adversely affecting the engaging condition due to axial displacement of the worm wheel, and which is capable of contributing to the reduction in size of the transmission system coupling from the power assisting motor to the steering mechanism.

According to the present invention, there is provided an electric power steering apparatus having a worm that is directly connected to an output side of a power assisting electric motor, and a worm wheel that is mounted coaxially with an output shaft connected to a steering mechanism and that engages with the worm, wherein the torque of the electric motor driven on the basis of the result of the detection of the steering torque applied at a steering wheel is transmitted to the output shaft through velocity reduction via the worm and worm wheel.

According to a first invention, the power steering apparatus is characterized by the provision of: a lock nut having a nut portion that is screwed onto a threaded portion formed on an outer circumference of the output shaft, and a tapered portion formed integrally on the advancing side of the nut portion and whose outer diameter gradually decreases toward an forward end thereof; a tapered fitting hole formed through an axis of the worm wheel and fitting on the tapered portion of the lock nut; and a support portion for supporting the worm wheel against axial pressure being exerted thereon via fitting faces of the tapered portion and fitting hole by the advancing motion of the lock nut. The worm wheel that transmits the rotation of the steering assisting electric motor to the output shaft, connected to the steering mechanism is provided on its axis with a tapered fitting hole, as described above; the tapered portion of the lock nut, which is screwed onto the outer circumference of the output shaft, is made to fit in the fitting hole, and as the lock nut is screwed in, one side face of the worm wheel is pressed via the fitting hole against the support portion formed on the same side, to hold the worm wheel in position.

According to a second invention, the power steering apparatus is characterized by the provision of: a lock nut that is screwed onto a threaded portion formed on an outer circumference of the output shaft; a tapered ring fitted on the output shaft on the advancing side of the lock nut and whose outer diameter gradually decreases in the advancing direction; a tapered fitting hole formed through an axis of the worm wheel and fitting on the tapered ring; and a support portion for supporting the worm wheel against axial pressure being exerted thereon via fitting faces of the tapered ring and fitting hole by the advancing motion of the lock nut. The tapered ring is made to fit in the tapered fitting hole formed through the axis of the worm wheel that transmits the rotation of the steering assisting electric motor to the output shaft connected to the steering mechanism, and the lock nut screwed on a threaded portion formed on the outer circumference of the output shaft is screwed in the advancing direction to press the tapered ring, as a result of which the worm wheel is held in position with one side face thereof pressed via fitting faces of the tapered ring and fitting hole against the support portion formed on the same side.

In the first invention (or the second invention), when an excessive rotational torque occurs in a motor lock situation, slippage is caused on fitting faces of the tapered portion (or the tapered ring) and fitting hole and on contact faces of the worm wheel and support portion, allowing free rotation of the output shaft against the worm wheel and thus preventing the occurrence of steering maneuverability loss. The upper limit torque above which the free rotation is allowed can be set accurately by tightening the lock nut and adjusting the bearing pressure on the fitting faces and contact faces. This ensures reliable operation as a mechanical torque limiter. Furthermore, since the worm wheel is held in position by the tapered portion (or the tapered ring) and support portion from both sides thereof and the axial movement of the worm wheel is thus restricted, engagement with the worm can be maintained in good condition at all times. The construction also contributes to reducing the size of the torque transmission system coupling from the steering assisting electric motor to the steering mechanism.

In the first or second invention, the output shaft is mounted inside the vehicle's compartment and is connected via a universal joint to the steering mechanism mounted outside the compartment. As a result, the operation as the torque limiter that occurs outside the output shaft is performed inside the compartment subjected to relatively small changes in ambient temperature and at a position not affected by the characteristic of the universal joint that exhibits transmission torque variations with changing rotating position. This ensures reliable operation under the desired rotational torque.

Furthermore, in the first invention (or the second invention), there is provided a slip plate that is interposed between fitting faces of the fitting hole and tapered portion (or tapered ring) and also between contact faces of the worm wheel and support portion, and that causes stable slippage when a circumferential force exceeding a predetermined limit occurs between these faces. As a result, free rotation of the output shaft under the application of the upper limit torque is accompanied by stable slippage on this slip plate, which ensures further accurate operation as the torque limiter.

In the first invention (or the second invention), a gap for allowing for an inward elastic deformation of the tapered portion (or the tapered ring) is provided between the outer circumference of the output shaft and the inner circumference of the tapered portion (or the tapered ring) that fits on the output shaft. As a result, under the application of an excessive rotational torque the tapered portion (or the tapered ring) is allowed to deform inwardly within the gap, relieving the bearing pressure between the worm wheel and the fitting hole and causing slippage between them without fail. This further enhances the accuracy in the operation as the torque limiter.

According to a third invention, the power steering apparatus is characterized in that a tapered portion whose diameter gradually decreases toward one end thereof in an axial direction and a threaded portion formed integrally on the smaller diameter side of the tapered portion are provided on an outer circumference of the output shaft, while a tapered fitting hole that matches the tapered portion is provided on an axis of the worm wheel, and in that the worm wheel is fitted on the tapered portion via the fitting hole, and is clamped in position with the pressure exerted toward the larger diameter side thereof by the tightening of the lock nut screwed on the threaded portion being supported by fitting faces of the fitting hole and tapered portion. The worm wheel that transmits the rotation of the steering assisting electric motor to the output shaft connected to the steering mechanism is provided on its axis with a tapered fitting hole, as described above; the tapered portion formed on the output shaft is made to fit in the fitting hole, and the lock nut screwed onto the output shaft from the smaller diameter side of the two tapered members is tightened to press the worm wheel against fitting faces of the fitting hole and tapered portion, to fix the worm wheel in position. When an excessive rotational torque occurs in a motor lock situation, slippage is caused on fitting faces of the tapered portion and fitting hole and on contact faces of the worm wheel and lock nut, allowing free rotation of the output shaft and thus preventing the occurrence of steering maneuverability loss. The upper limit torque above which the free rotation of the output shaft is allowed can be set accurately by adjusting the tightening of the lock nut and hence the bearing pressure on these fitting faces and contact faces. This ensures reliable operation as a mechanical torque limiter and prevents the occurrence of steering maneuverability loss resulting from a motor lock. Furthermore, since the worm wheel is held in position at one side by the tapered portion formed on the output shaft and at the other by the lock nut and the axial movement of the worm wheel is thus restricted, engagement with the worm can be maintained in good condition at all times.

Furthermore, in the third invention, there is provided a slip plate that is interposed between fitting faces of the fitting hole and tapered portion and also between contact faces of the worm wheel and lock nut, and that causes stable slippage when a circumferential force exceeding a predetermined limit occurs between these faces. As a result, free rotation of the output shaft is allowed with stable slippage on this slip plate, ensuring further accurate operation as the torque limiter. Thus, the provision of the torque limiter of simple construction applicable to a worm gear-type reduction mechanism contributes to reducing the size of the torque transmission system coupling from the steering assisting electric motor to the steering mechanism.

According to a fourth invention, the power steering apparatus is characterized in that the worm wheel is fitted on an outer circumference of the output shaft via a plurality of rolling members arranged circumferentially, and by tightening a lock nut that screwed onto one end of the fitting portion, the worm wheel is held in position directly or indirectly between the lock nut and a support portion formed on the other end of the fitting portion. The worm wheel is fitted onto the output shaft with the circumferentially arranged rolling members interposed therebetween, and by tightening the lock nut screwed onto the output shaft from the one end, the worm wheel is pressed against the support portion on the other end, thereby fixing it in position. When an excessive rotational torque occurs in a motor lock situation, slippage is caused on contact faces on both sides of the worm wheel against the lock nut and the support portion, allowing free rotation of the output shaft and thus preventing the occurrence of steering maneuverability loss. The upper limit torque above which the free rotation of the output shaft is allowed can be set accurately by adjusting the tightening of the lock nut and hence the bearing pressure on the contact faces on both sides of the worm wheel. This ensures reliable operation as a mechanical torque limiter and prevents the occurrence of steering maneuverability loss resulting from a motor lock. Furthermore, since the worm wheel rotates with its axial movement restricted by the lock nut and support portion from both sides thereof and its radial movement by the rolling members, engagement with the worm can be maintained in good condition at all times.

Furthermore, in the fourth invention, there are provided slip plates that are respectively interposed between contact faces of the worm wheel and lock nut and between contact faces of the worm wheel and support portion, and that cause stable slippage when a circumferential force exceeding a predetermined limit occurs between said faces. As a result, free rotation of the output shaft is allowed with stable slippage on these slip plates, ensuring further accurate operation as the torque limiter. Thus, the provision of the torque limiter of simple construction applicable to a worm gear-type reduction mechanism contributes to reducing the size of the torque transmission system coupling from the steering assisting electric motor to the steering mechanism.

The above and further objects and features of the invention will more fully be apparent from the following detailed description with accompanying drawings.

DESCRIPTION OF THE PREFERRED EMBODIMENTS

The preferred embodiments of the present invention will now be described below with reference to the accompanying drawings.

[Embodiment 1]

Figure 1:
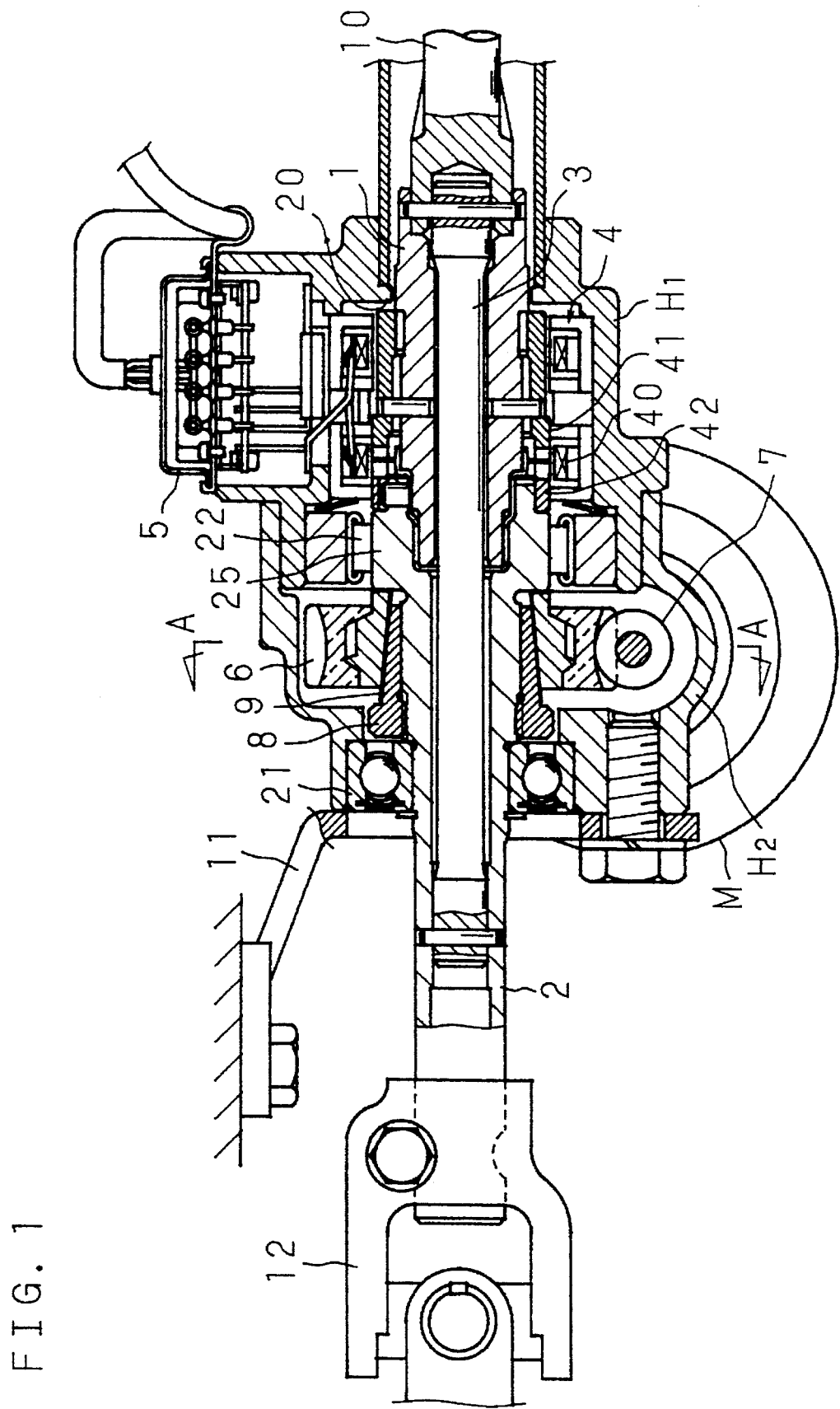
FIG. 1 is a longitudinal cross-sectional view showing essential portions of a power steering apparatus according to the invention.

FIG. 1 is a longitudinal cross-sectional view showing essential portions of a power steering apparatus according to first and second embodiments of the invention. In the figure, the numeral 1 designates an input shaft, and 2 indicates an output shaft. These shafts are connected coaxially via a torsion bar 3 and supported rotatably inside a common housing that is cylindrical in shape. The housing consists of a sensor housing H1 on the input shaft 1 side and a transmission housing H2 on the output shaft 2 side, which are constructed integrally in coaxial fashion. Inside the sensor housing H1, there is installed a torque sensor 4 outside the connecting portion between the input shaft 1 and the output shaft 2.

The torque sensor 4 is of a known configuration; that is, the torque sensor 4 has detection rings 41 and 42 fixed in position with respective end faces facing the input shaft 1 and output shaft 2, and a change in the magnetic resistance occurring in the magnetic circuit formed by the detection rings 41 and 42 is detected as a change in the impedance of an output coil 40 which is wound around the two detection rings 41 and 42. Feeding to the torque sensor 4 and extraction of output from it are accomplished via a terminal box 5 mounted in protruding fashion outside the sensor housing H1.

The upper end portion of the input shaft 1 which protrudes upwardly (rightwardly in the figure) of the sensor housing H1 is connected to a steering wheel (not shown) via a steering column 10 so that the steering torque applied at the steering wheel for steering is transmitted via the steering column 10. To the underside of the outer surface of the transmission housing H2 is fixed a support bracket 11 that is formed by bending a flat plate of prescribed flat shape into an L shape. The transmission housing H2 and sensor housing H1, together with the output shaft 2 and input shaft 1 supported therein, are supported inside a vehicle's compartment by means of the support bracket 11.

The lower end portion of the output shaft 2 which protrudes downwardly (leftwardly in the figure) of the transmission housing H2 is connected to the steering mechanism mounted outside the compartment. This connection is accomplished by a universal joint 12 a portion of which is shown in the figure. The universal joint 12 functions to absorb any positional displacement and differences in tilt angle of the output shaft 2 with respect to the input end of the steering mechanism so that the rotation of the output shaft 2 is properly transmitted to the steering mechanism to accomplish steering action.

The input shaft 1 connected to the upper end of the output shaft, 2 is indirectly supported at two places appropriately spaced apart in the longitudinal direction, i.e., at one place by a bearing (not shown) supporting the steering column 10 integrally connected to the upper end of the input shaft 1, and at the other by a bearing bush fitted inside the output shaft 2. Around a circumferential edge of the upper opening of the sensor housing H1 through which the input shaft 1 protrudes, there is formed a jaw 20 facing the outer circumference of the input shaft 1 with a slight gap provided therebetween. The jaw 20 serves to limit the wobbling of the input shaft 1, thereby preventing the variation of the gap provided between the output coil 40 and the detection ring 41 in the torque sensor 4.

On the other hand, the output shaft 2 is supported at two places appropriately spaced apart in the longitudinal direction, i.e., at one place by a needle-like roller bearing 22 fitted to the inner circumference of the lower opening of the sensor housing H1, and at the other by a ball bearing 21 fitted to the inner circumference of the lower opening of the transmission housing H2. Between the two support places, there is mounted a worm wheel 6, as will be described later, and a worm 7 is made to engage with the outer circumference of the worm wheel 6 from a direction orthogonal to the shaft axis.

Figure 2:
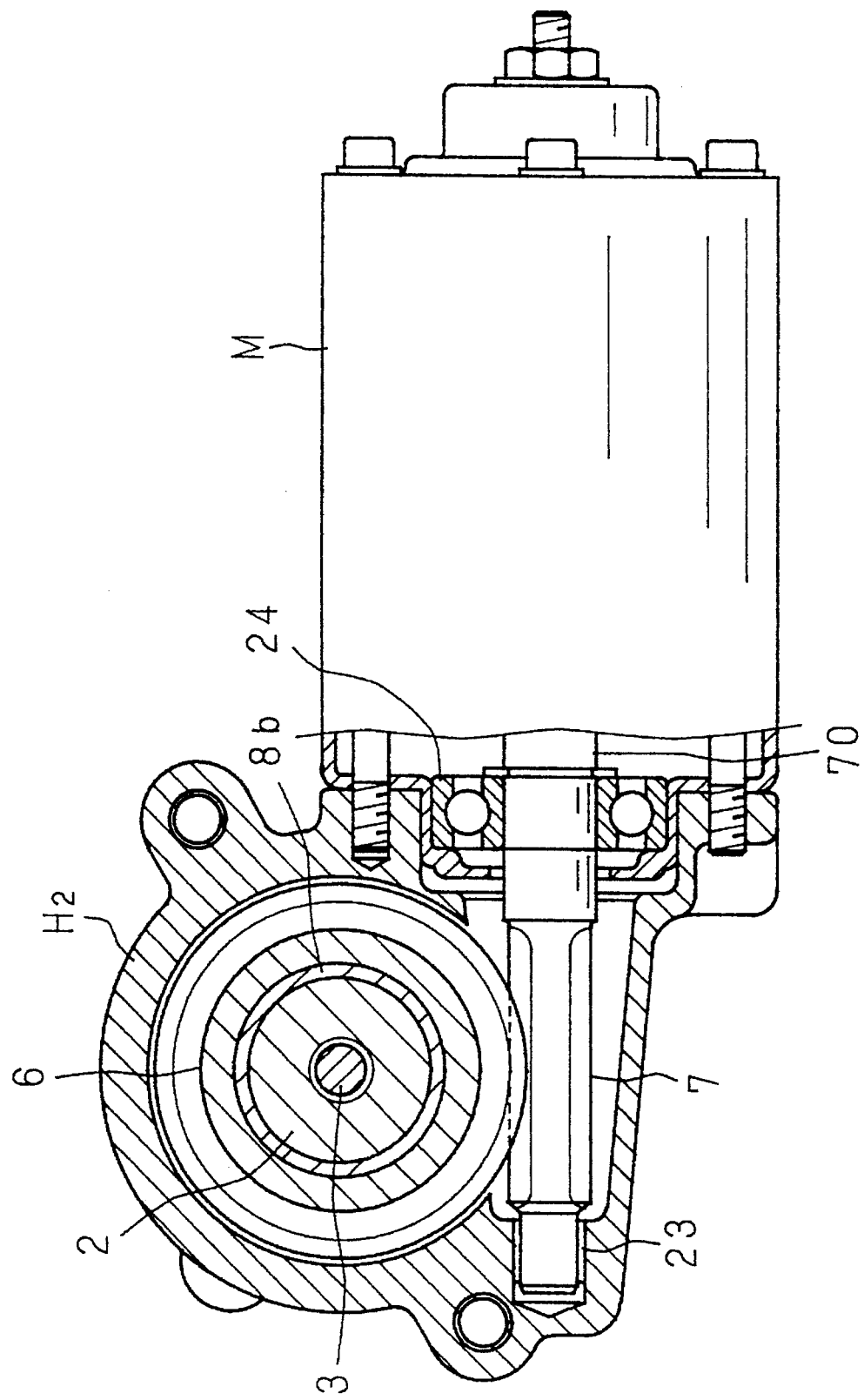
FIG. 2 is a transverse cross-sectional view, taken along line A—A in FIG. 1, showing a transmission system coupling from a steering assisting motor to an output shaft.

FIG. 2 is a transverse cross-sectional view taken along line A—A in FIG. 1, illustrating a condition in which the worm 7 engages with the worm wheel 6. As shown, a steering assisting motor M is fixed in position outside the transmission housing H2 in correspondence with the mounting position of the worm wheel 6. A rotation shaft 70, the output end of the motor M, extends into the transmission housing H2 in a direction orthogonal to the axis of the worm wheel 6, and is supported by a bearing bush 23 fixed inside the transmission housing H2 and a bearing 24 inside the motor M with the engaging portion with the worm wheel 6 interposed therebetween. The worm 7 is formed integrally with the outer circumference of the rotation shaft 70 between the support positions by the bearing bush 23 and bearing 24, and is made to engage with the outer circumference of the worm wheel 6.

Figure 3:
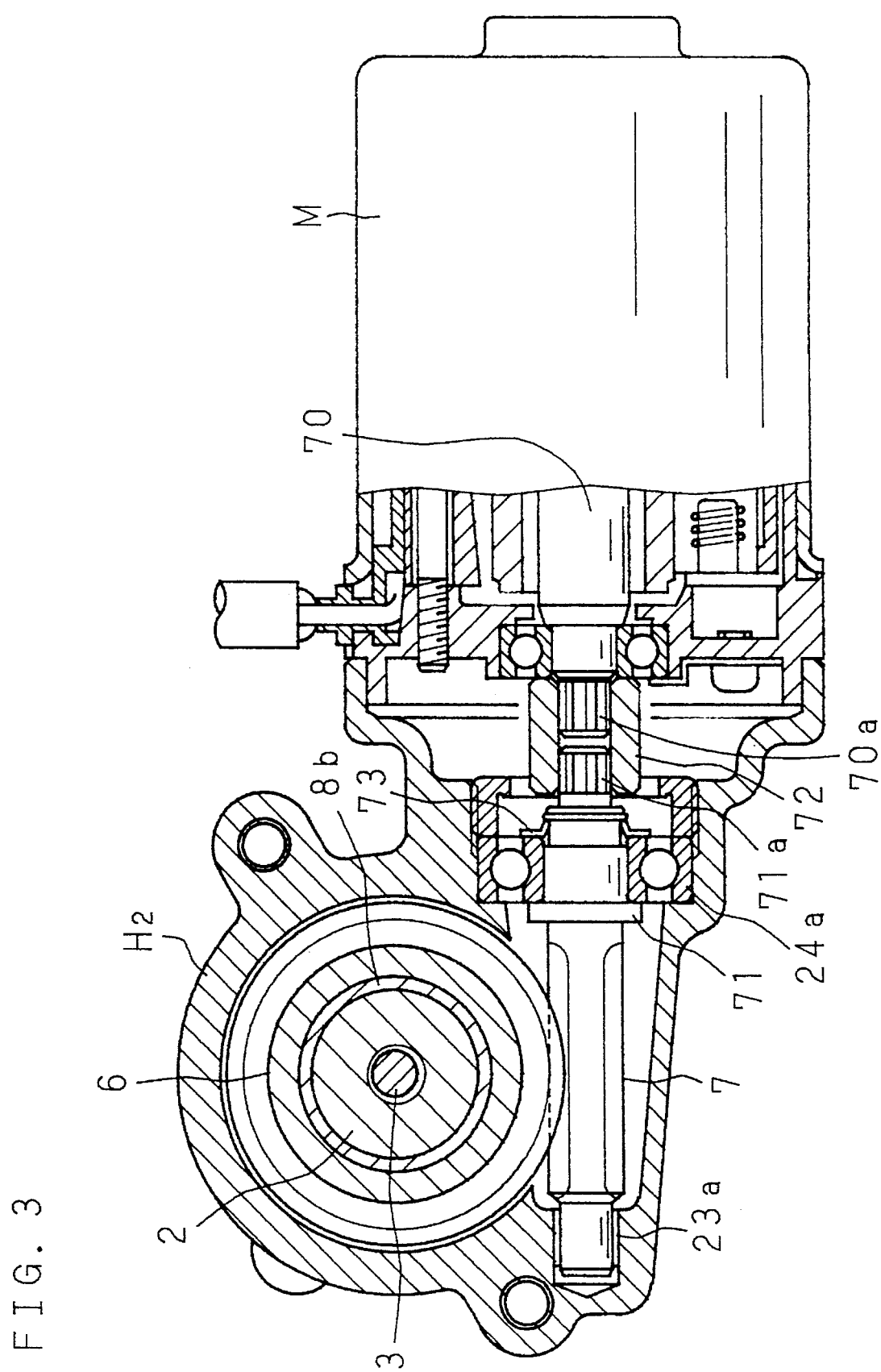
FIG. 3 is a transverse cross-sectional view showing a transmission system coupling from the steering assisting motor to the output shaft according to another embodiment.

FIG. 3 is a transverse cross-sectional view showing another embodiment of the transmission system coupling from the motor M to the output shaft 2. In the figure, a rotation shaft 70, the output end of the motor M, is formed to protrude by an appropriate length into the transmission housing H2, and splines 70a are formed in the outer circumferential surface of the protruding portion. On the other hand, the worm 7 is mounted on a worm shaft 71 which is formed separate from the rotation shaft 70. The worm shaft 71 is supported rotatably about the common axis with the rotation shaft 70, at both ends of the engaging portion with the worm wheel 6, i.e. at one end by a bearing bush 23a and at the other by a ball bearing 24a fixed inside the transmission housing H2. Splines 71a are formed in the outer circumferential surface of one end of the worm shaft 71 which faces the protruding end of the rotation shaft 70. The rotation shaft 70 and the worm shaft 71 are connected by a coupling cylinder 72 whose inner circumferential surface is formed with splines that engage with the splines 70a and 71a respectively.

The coupling cylinder 72 shown in FIG. 3 is press-fitted on the rotation shaft 70 of the motor M, and the connection between the rotation shaft 70 and the worm shaft 71 is accomplished by causing the end of the coupling cylinder 72 press-fit on the rotation shaft 70 to engage with the splines 71a of the worm shaft 71 when mounting the motor M to the transmission housing H2.

Figure 4:
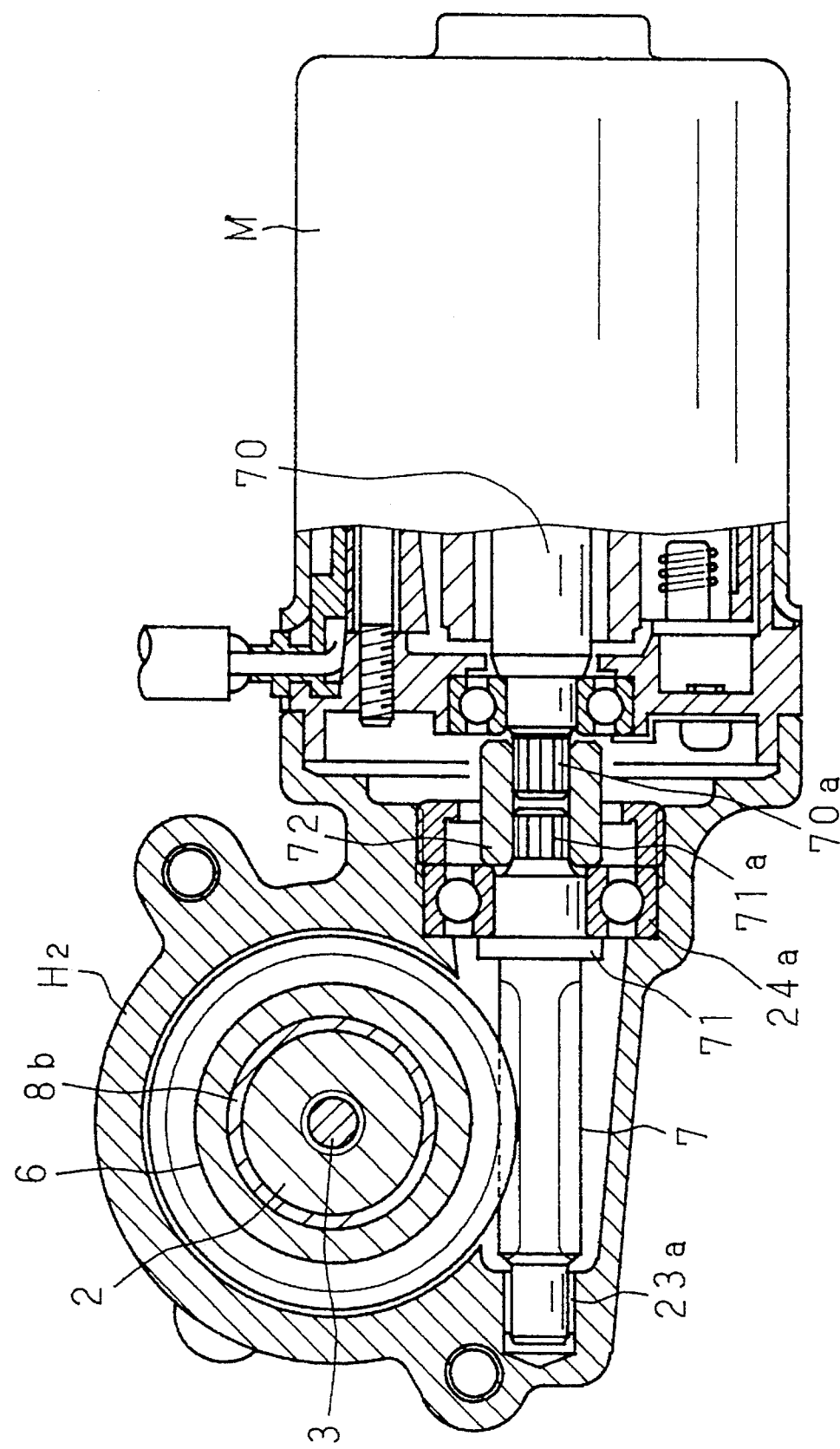
FIG. 4 is a transverse cross-sectional view showing a transmission system coupling from the steering assisting motor to the output shaft according to a further embodiment.

FIG. 4 is a transverse cross-sectional view showing a further embodiment of the transmission system coupling from the motor M to the output shaft 2. As contrasted with the above embodiment, the coupling cylinder 72 shown here is press-fitted on the worm shaft 71, and the connection between the rotation shaft 70 and the worm shaft 71 is accomplished by causing the splines 70a on the end of the rotation shaft 70 to engage with the coupling cylinder 72 press-fitted on the worm shaft 71.

When compared with the construction shown in FIG. 2, either construction shown in FIG. 3 or 4 has the disadvantage of increasing the number of parts, but offers the advantage that since the assembling of the worm shaft 71 and the mounting of the motor M are carried out in separate processes, proper engagement between the worm 7 and the worm wheel 6 can be obtained easily when assembling the worm shaft 71, which not only contributes to reducing the number of assembling steps but facilitates the disassembly and reassembly necessary when servicing the transmission system for maintenance. Furthermore, according to the construction shown in FIG. 4, the coupling cylinder 72 press-fitted on the worm shaft 71 functions as a stopper for the ball bearing 24a that supports the worm shaft 71, eliminating the need for a stopper ring 73 shown in FIG. 3.

In the thus constructed power steering apparatus, when the steering wheel is rotated for steering, the rotating motion is transmitted to the output shaft 2 via the input shaft 1 and torsion bar 3, and further on to the steering mechanism (not shown) connected to the lower end of the output shaft 2 to accomplish the steering of the road wheels. At this time, the road resistance acting on the steered road wheels is transmitted to the output shaft 2 via the steering mechanism, and a torsion proportional to the steering torque applied at the steering wheel is caused to the torsion bar 3 which connects the input shaft 1 with the output shaft 2. This torsion causes a relative angular displacement between the detection rings 41 and 42 in the torque sensor 4, which in turn causes a change in the magnetic resistance of the magnetic circuit formed by them. The torque sensor 4 thus produces an output, corresponding to the steering torque applied at the steering wheel.

The output of the torque sensor 4 is fed to a controller (not shown) to control the drive current for the motor M. With the drive current controlled, the motor M produces a torque proportional to the magnitude and direction of the steering torque applied at the steering wheel. This torque is transmitted to the output shaft 2 through a prescribed velocity reduction provided by the worm 7 and worm wheel 6, and further on to the steering mechanism, so that the steering action performed by operating the steering wheel as previously described is assisted by the torque of the motor M.

In assisting the steering force, the torque of the motor M is increased through velocity reduction between the worm 7 and worm wheel 6 before being transmitted to the steering mechanism. The compact motor M can thus provide sufficient steering assisting power. Furthermore, since the velocity reduction is provided by a reduction mechanism of simple construction consisting of the worm 7 and worm wheel 6, the steering assisting power transmission system coupling from the motor M to the output shaft 2 can be constructed compact, as previously described.

The feature of the power steering apparatus according to the invention lies in the mounting construction for the worm wheel 6 that forms part of the reduction mechanism. As shown in FIG. 1, the output shaft 2 includes a support portion 25 that provides a larger diameter at a portion supported by the needle-like roller bearing 22 than at other portions, and also includes a threaded portion 26 of prescribed length (see FIG. 6) formed on the outer circumference thereof between the support portion 25 and the portion supported by the ball bearing 21, while the worm wheel 6 is mounted with one side thereof pressed on the support portion 25 by screwing in a lock nut 8 that is screwed to the threaded portion 26.

Figure 5:
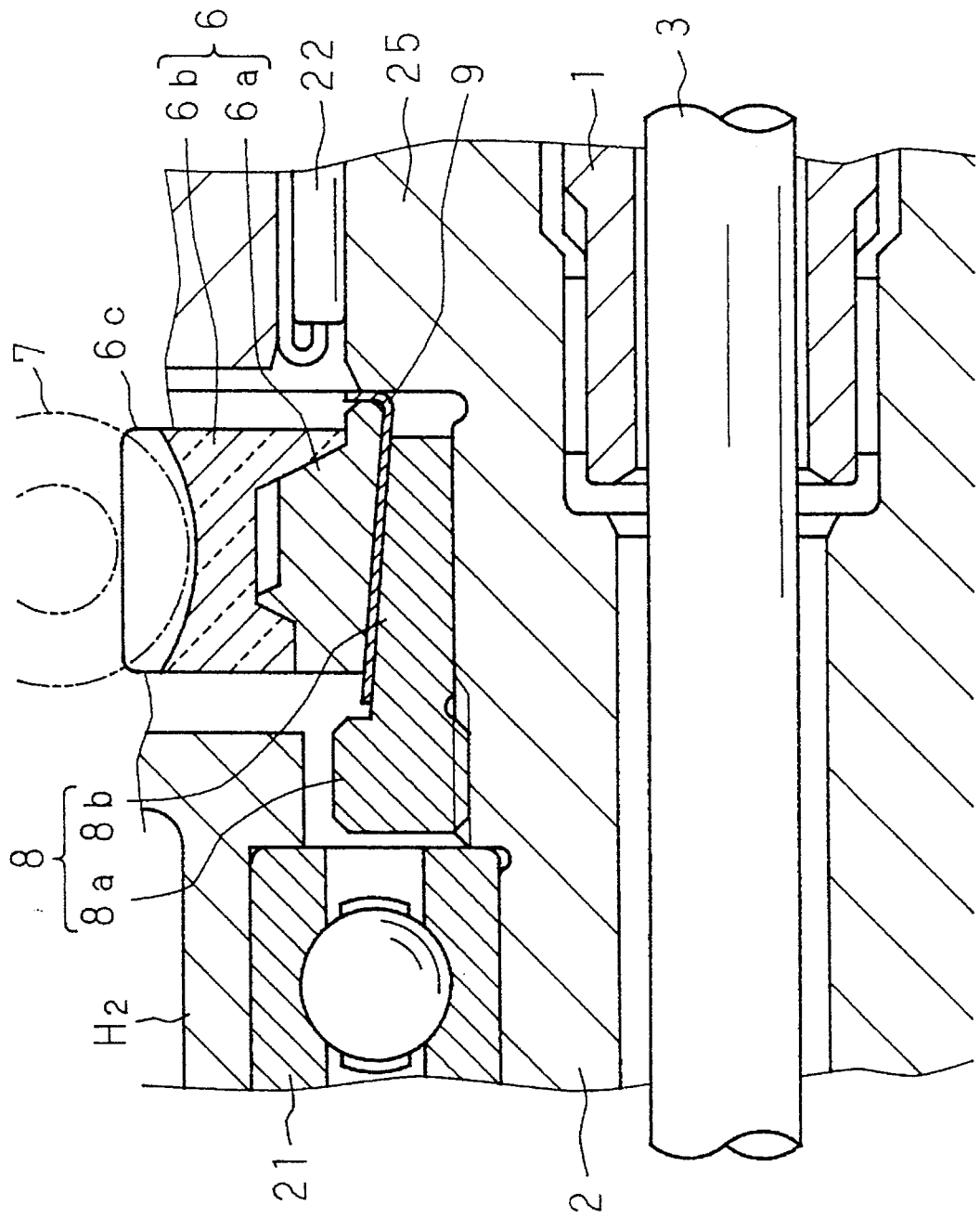
FIG. 5 is an enlarged cross-sectional view showing an example of the portion that characterizes a first embodiment of the invention.
Figure 6:
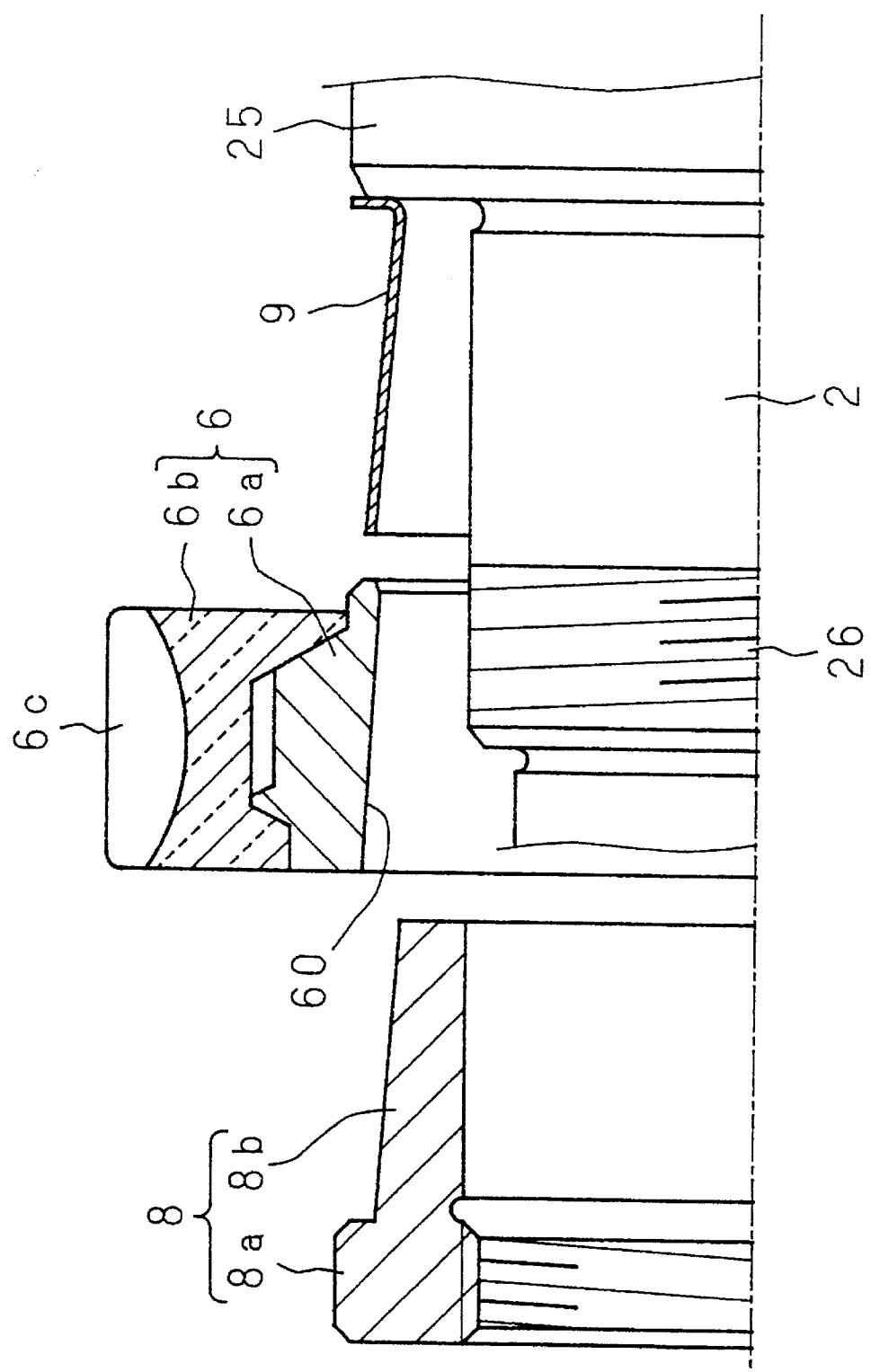
FIG. 6 is a diagram for explaining an assembling procedure for the portion that characterizes the first embodiment.

FIG. 5 is an enlarged cross-sectional view showing the mounting portion of the worm wheel 6 and its adjacent portions, and FIG. 6 is a diagram for explaining an assembling procedure for the worm wheel 6. As shown, the worm wheel 6 has a metal boss 6a and a plastic gear 6b integrally molded around the outer circumference of the boss 6a. As shown in FIGS. 1 and 5, the worm 7 engages with worm teeth 6c cut on the outer circumference of the gear 6b. The boss 6a is an annular member having an fitting hole 60 opened through its axis across the thickness thereof. As shown in FIG. 6, the fitting hole 60 is formed as a tapered hole with its diameter linearly decreasing toward one end thereof in the axial direction.

The lock nut 8 has a nut portion 8a whose inner circumferential surface is formed with internal threads that mesh with the threaded portion 26 formed on the outer circumference of the output shaft 2, and a tapered portion 8b that is formed to be coaxial with the nut portion 8a on the advancing side thereof and whose outer diameter decreases toward the forward end thereof. The tapered portion 8b is so formed that the largest outer diameter at its base end is larger than the largest inner diameter of the fitting hole 60 of the worm wheel 6, and the smallest outer diameter at its forward end is larger than the smallest inner diameter but smaller than the largest inner diameter of the fitting hole 60, the slope of the taper from the base end to the forward end being made to match that of the fitting hole 60.

The worm wheel 6 is mounted on the output shaft 2 in the following procedure. First, as shown in FIG. 6, the worm wheel 6 is tentatively fitted on the output shaft 2 with the smaller diameter side of the fitting hole 60 facing the support portion 25; then, the locknut 8 is inserted with the tapered portion 8b facing the lower end of the output shaft 2, and as the tapered portion 8b is inserted into the gap between the fitting hole 60 and the output shaft 2, the internal threads on the inner circumference of the nut portion 8a are screwed onto the threaded portion 26. In this condition, the lock nut 8 is tightened to complete the mounting procedure.

In this mounting procedure, a slip plate 9 is placed between the tapered portion 8b and the fitting hole 60; as shown, the lock nut 8 is tightened with the slip plate 9 interposed between the fitting hole 60 and the outer circumference of the tapered portion 8b and also between the support portion 25 and the end face of the tapered portion 8b respectively. In this condition, the worm wheel 6 is pressed in the axial direction along the slope of the tapered portion 8b as the tapered portion 8b advances with the screwing in of the lock nut 8, and is held in position with its axial movement restricted by the support portion 25 on which one face of the worm wheel 6 is pressed. Accordingly, the rotation of the worm wheel 6 driven by the worm 7 is transmitted to the output shaft 2 by the friction occurring via the slip plate 9 between the fitting hole 60 and the tapered portion 8b and between the tapered portion 8b and the support portion 25.

The slip plate 9 is a plate member of thin wall thickness, comprising, for example, a base that is formed from a metal mesh having excellent flexibility and resilience and whose entire outer surfaces are coated with a synthetic resin having a stable friction characteristic such as a fluorocarbon resin (PTFE resin). As shown in FIG. 6, the slip plate 9 is formed so as to have a jaw for pressing against the support portion 25, at one end of a truncated cone formed by the fitting hole 60 in the worm wheel 6 and the slope of the tapered portion 8b of the lock nut 8. The slip plate 9 is tentatively fitted into the fitting hole 60, and in this condition, the lock nut 8 is tightened to fix it in position, as described above. Such a slip plate 9 is commercially available under a brand name HIGH PLAST, for example, but any other material may be used as long as the material has the above-mentioned characteristics, and among others, stable friction characteristic.

With the worm wheel 6 mounted as described above, the frictional force occurring at the fitting faces of the fitting hole 60 and tapered portion 8b and at the contact faces of the tapered portion 8b and support portion 25 is uniquely dependent on the bearing pressure at the slip plate 9 interposed between these faces, and this bearing pressure can be accurately set by adjusting the tightening torque of the lock nut 8. When the rotational torque corresponding to the thus set frictional force is applied to the worm wheel 6, slippage occurs on one surface or both surfaces of the slip plate 9, and the slip plate 9 acts as a mechanical torque limiter to disconnect the coupling between the worm wheel 6 and the output, shaft 2, allowing free rotation of the output shaft 2.

Accordingly, the bearing pressure applied to the slip plate 9 is set by adjusting the tightening torque of the lock nut 8 so that slippage occurs upon the application of a prescribed upper limit torque, and by determining the upper limit torque by reference to the maximum torque that the steering assisting motor M can produce in normal operation, it is possible to prevent the occurrence of steering maneuverability loss in the event of the locking of the motor M. Further, after the locked condition is released, the coupling between the worm wheel 6 and the output shaft 2 is restored by the friction of the slip plate 9, allowing the torque of the motor M to be transmitted to provide steering assisting power.

Furthermore, since the axial movement of the worm wheel 6 is restricted by the tapered portion 8b pressed against the support portion 25, engagement with the worm 7 is maintained in good condition at all times, including the above-described slipping situation, and there is no possibility of hindering the steering assisting operation. The slip plate 9 also serves as a spacer to fill the gap between the fitting hole 60 and the taper portion 8b and also to absorb machining errors on the inner circumferential surface of the fitting hole 60 or the outer circumferential surface of the tapered portion 8b. Accordingly, by adjusting the thickness of the slip plate 9, the axial positioning of the worm wheel 6 determined by the tightening of the lock nut 8 can be optimized, thus preventing improper engagement with the worm 7 resulting from machining errors.

The above-described operation as the torque limiter is achieved utilizing the slippage of the worm wheel 6 on the output shaft 2. Since the output shaft 2 is located inside the driver's compartment subjected to relatively small changes in ambient temperature, as earlier described, when selecting the material for the slip plate 9 attention should only be paid to the slip characteristic within a relatively small temperature range; this provides a wider selection of materials, and ensures stable operation as the torque limiter.

On the other hand, the output shaft 2 is connected to the steering mechanism via the universal joint 12. It is generally known that when a universal joint is installed in a transmission system and motion is transmitted to the driven side installed at an angle to the driving side, torque variations occur at the driven side, the torque being varied up and down from the torque of the driving side with a cycle equal to one revolution of the driving side. In the present invention, since the operation as the torque limiter takes place at the output shaft 2 positioned nearer to the steering wheel than the universal joint 12, that is, at the driving side for steering, the effect of the above-described torque variations is eliminated, and stable action under a predetermined rotational torque is ensured.

The present embodiment also includes a construction that does not use the slip plate 9 and in which the inner circumferential surface of the fitting hole 60 of the worm wheel 6 is made to directly contact the outer circumferential surface of the tapered portion 8b of the lock nut 8, the friction between them performing the function of a torque limiter. With this construction, however, it is difficult to grasp the frictional force acting at the contact faces, and a certain degree of error is inevitable in the initial setting of the upper limit torque.

Further, the lock nut 8 is of a screw type with the internal threads on the inner circumference of the nut portion 8a having the function of self-locking on the threaded portion 26, thus serving the locking function to prevent the positional displacement of the worm wheel 6 after it is tightened in position. This locking function can also be achieved by a construction in which the internal threads on the inner circumference of the nut portion 8a are formed in an ordinary screw shape and a positioning nut to be screwed to the threaded portion 26 is made to abut on the underside of the nut portion 8a.

Figure 7:
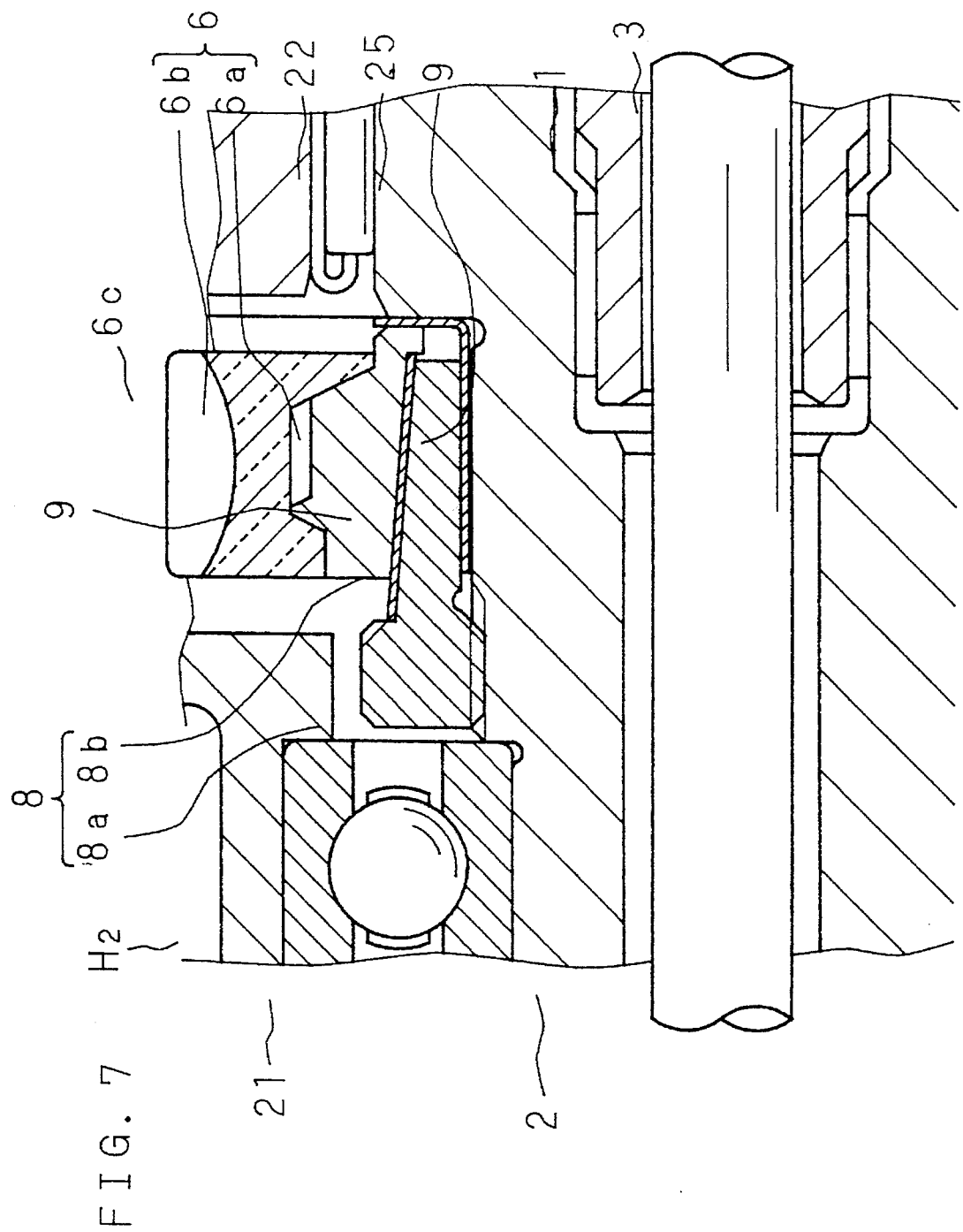
FIG. 7 is an enlarged cross-sectional view showing another example of the portion that characterizes the first embodiment.
Figure 8:
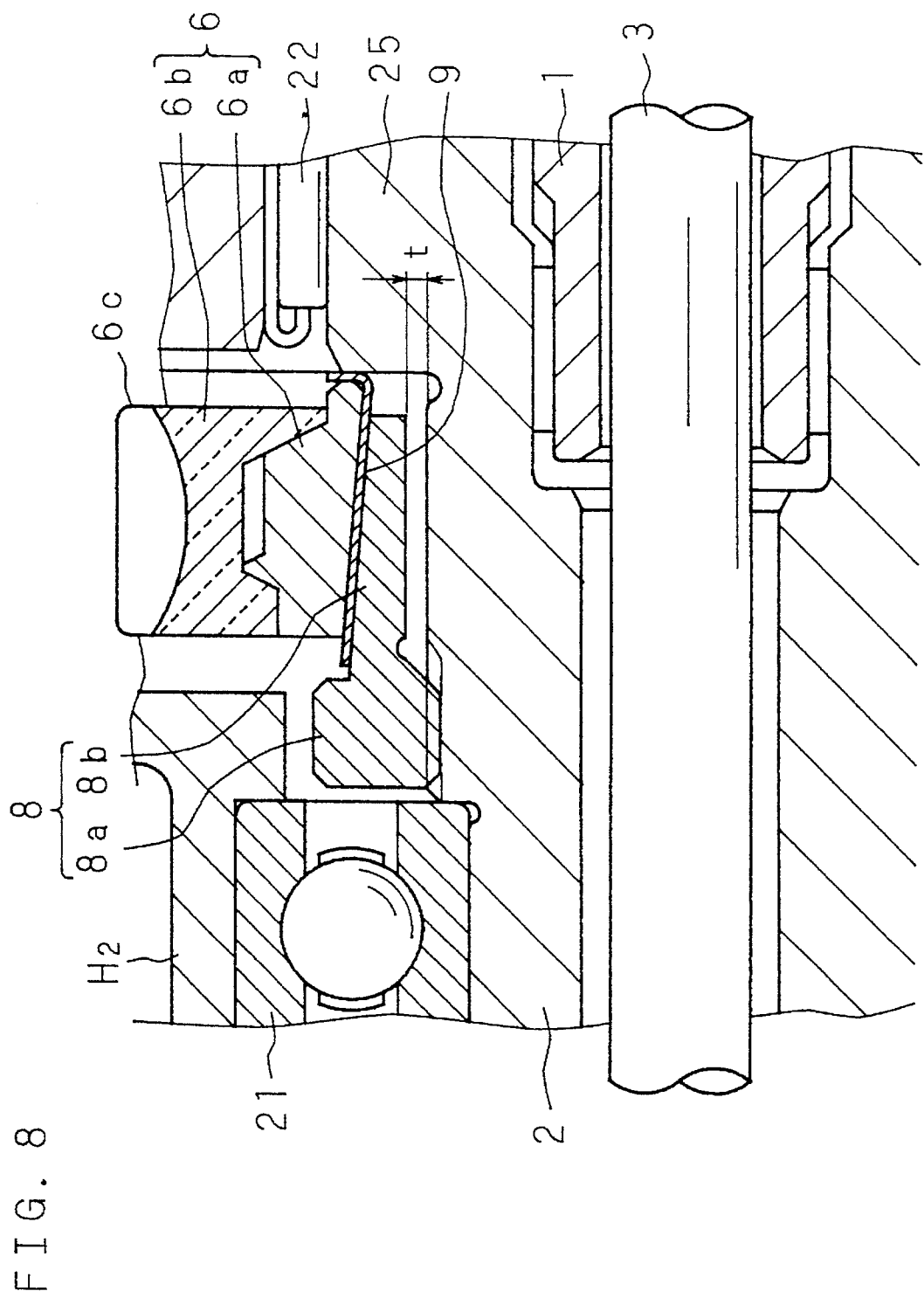
FIG. 8 is an enlarged cross-sectional view showing a further example of the portion that characterizes the first embodiment.

FIGS. 7 and 8 are enlarged cross-sectional views of essential portions illustrating other modifications of the first embodiment. In FIG. 7, a slip plate 9 is interposed between the inner circumference of the tapered portion 8b and the outer circumference of the output shaft 2, in addition to the slip plate 9 interposed between the fitting hole 60 and the outer circumference of the tapered portion 8b and between the support portion 25 and the end face of the tapered portion 8b. According to this construction, since the lock nut 8 is tightened under the presence of stable frictional force by the function of the slip plate 9 between the inner circumference of the tapered portion 8b and the outer circumference of the output shaft 2, further accuracy is ensured in the initial setting of the bearing pressure at the fitting faces of the tapered portion 8b and the fitting hole 60 and also at the contact faces of the tapered portion 8b and the support portion 25, which enhances the accuracy of the torque limiter action accomplished by the slippage between these faces via the slip plate 9.

In the embodiment shown in FIG. 8, there is provided, between the inner circumference of the tapered portion 8b of the lock nut 8 and the outer circumference of the output shaft 2, a prescribed gap t that is sufficiently larger than the minimum gap required for the fitting of the two members. The gap t is provided to allow for an inward elastic deformation of the tapered portion 8b. Since the lock nut 8 is tightened with no substantial friction occurring between the inner circumference of the tapered portion 8b and the outer circumference of the output shaft 2, this construction has the effect of ensuring further accurate torque limiter action, as in the embodiment shown in FIG. 7.

Figure 9:
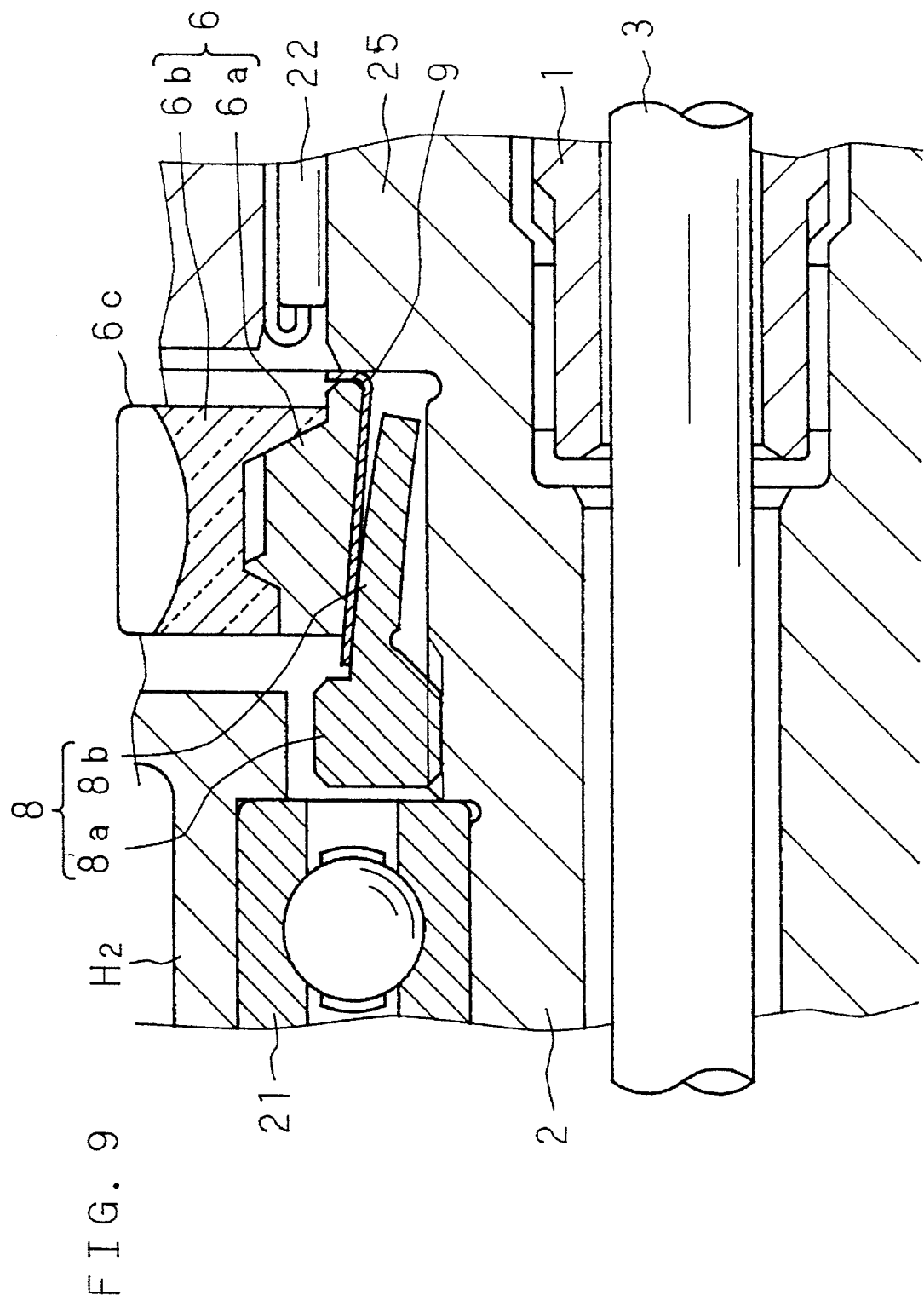
FIG. 9 is a diagram for explaining the operation of the embodiment shown in FIG. 8.

Furthermore, when an excessive rotational torque occurs that causes slippage on the slip plate 9, the tapered portion 8b is deformed within the range of the gap t, as shown in FIG. 9, relieving the bearing pressure between the outer circumferential surface of the tapered portion 8b and the inner circumferential surface of the fitting hole 60 and thus facilitating slippage on the slip plate 9 interposed between the two surfaces. This has the effect of increasing safety since the manual steering that will become necessary in the event of the locking of the steering assisting motor M can be accomplished by the application of a relatively small steering torque. In FIGS. 8 and 9, the gap t between the inner circumference of the tapered portion 8b and the outer circumference of the output shaft 2 and the deformation of the tapered portion 8b caused within the gap t are greatly exaggerated for clarity, but actually, the gap t and the deformation of the tapered portion 8b are only slight in the order of less than 1 mm.

[Embodiment 2]

Figure 10:
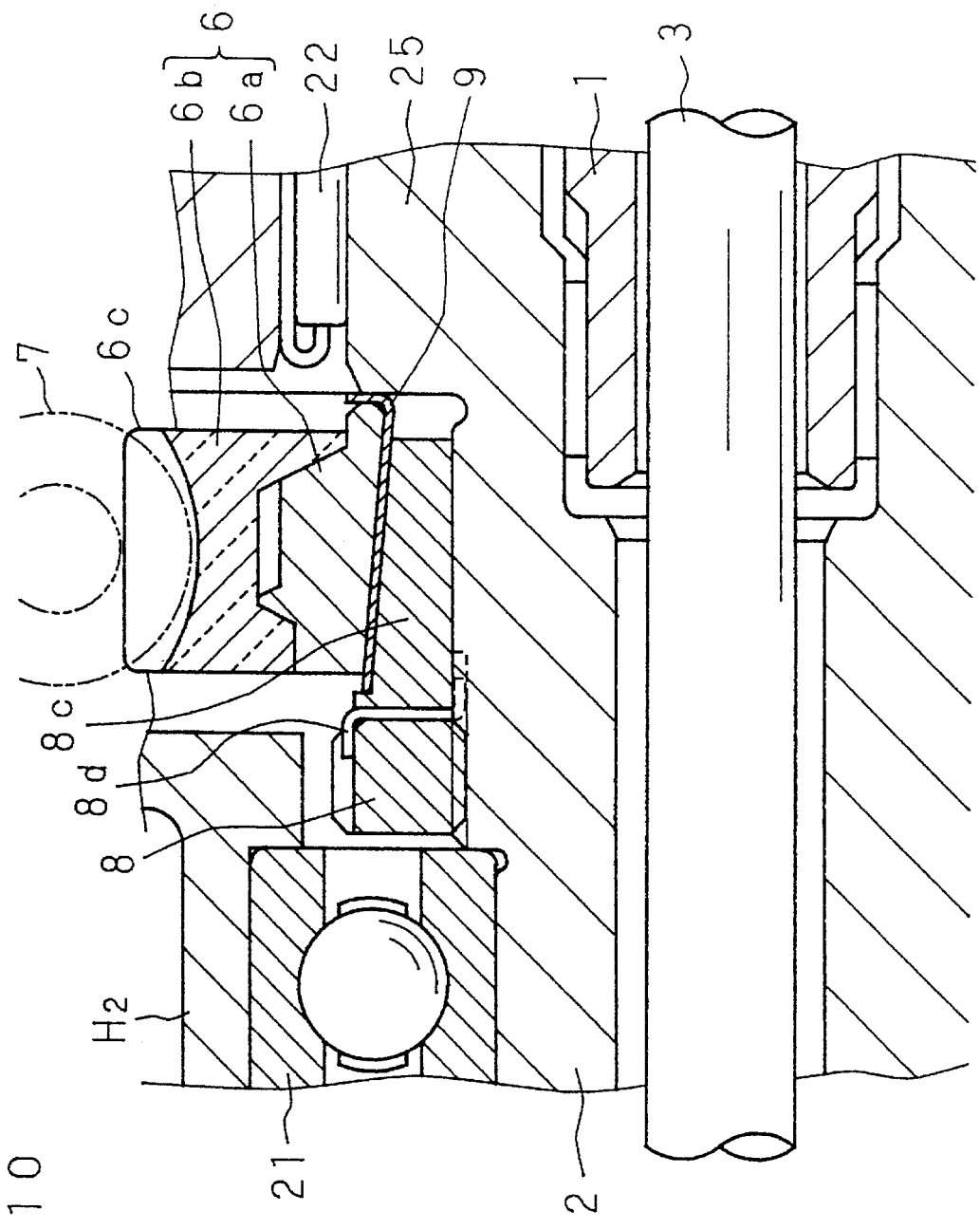
FIG. 10 is an enlarged cross-sectional view showing an example of the portion that characterizes a second embodiment of the invention.

FIG. 10 is an enlarged cross-sectional view of essential portions illustrating the second embodiment of the invention. This embodiment is different from the foregoing embodiments in that a tapered ring 8c that is fitted into the fitting hole 60 of the worm wheel 6 is formed as a separate member from the lock nut 8 that is screwed on the threaded portion 26 on the outer circumference of the output shaft 2; in the construction of this embodiment, the tapered ring 8c is pressed from its larger diameter side as the lock nut 8 is screwed in, and the worm wheel 6 is held and fixed in position between the fitting face of the tapered ring 8c and the fitting hole 60 and the end face of the support portion 25.

According to this construction, since there is no need to secure the concentricity with the internal threaded portion formed on the inner circumference of the lock nut 8, it is easy to enhance the machining accuracy of the inner and outer circumferential surfaces of the tapered ring 8c, and the fitting gaps between the tapered ring 8c and the output shaft 2 and between the tapered ring 8c and the worm wheel 6 can be made uniform around the entire circumference. As a result, the rotational torque that causes slippage on the slip plate 9, that is, the operating torque of the torque limiter can be controlled with high accuracy.

In the construction shown in FIG. 10, it will be noted that a washer 8d is interposed between the abutting faces of the lock nut 8 and tapered ring 8c. The washer 8d is a tongued washer having bendable ribs at several places on the outer rim and at one place on the inner rim and widely used as a washer for fixing the inner ring of a roller bearing. The washer 8d is fitted by a known procedure; that is, with the rib on the inner rim fitted into a groove (not shown) formed in the output shaft 2, the lock nut 8 is tightened with a prescribed tightening torque, and then, the ribs on the outer rim are bent to fit into some of equally spaced grooves formed in outer circumferential surface of the lock nut 8. The thus fitted washer prevents the dragging of the tapered ring 8c when tightening the lock nut 8, and reliably locks the lock nut 8 against rotation after it is tightened in place.

[Embodiment 3]

Figure 11:
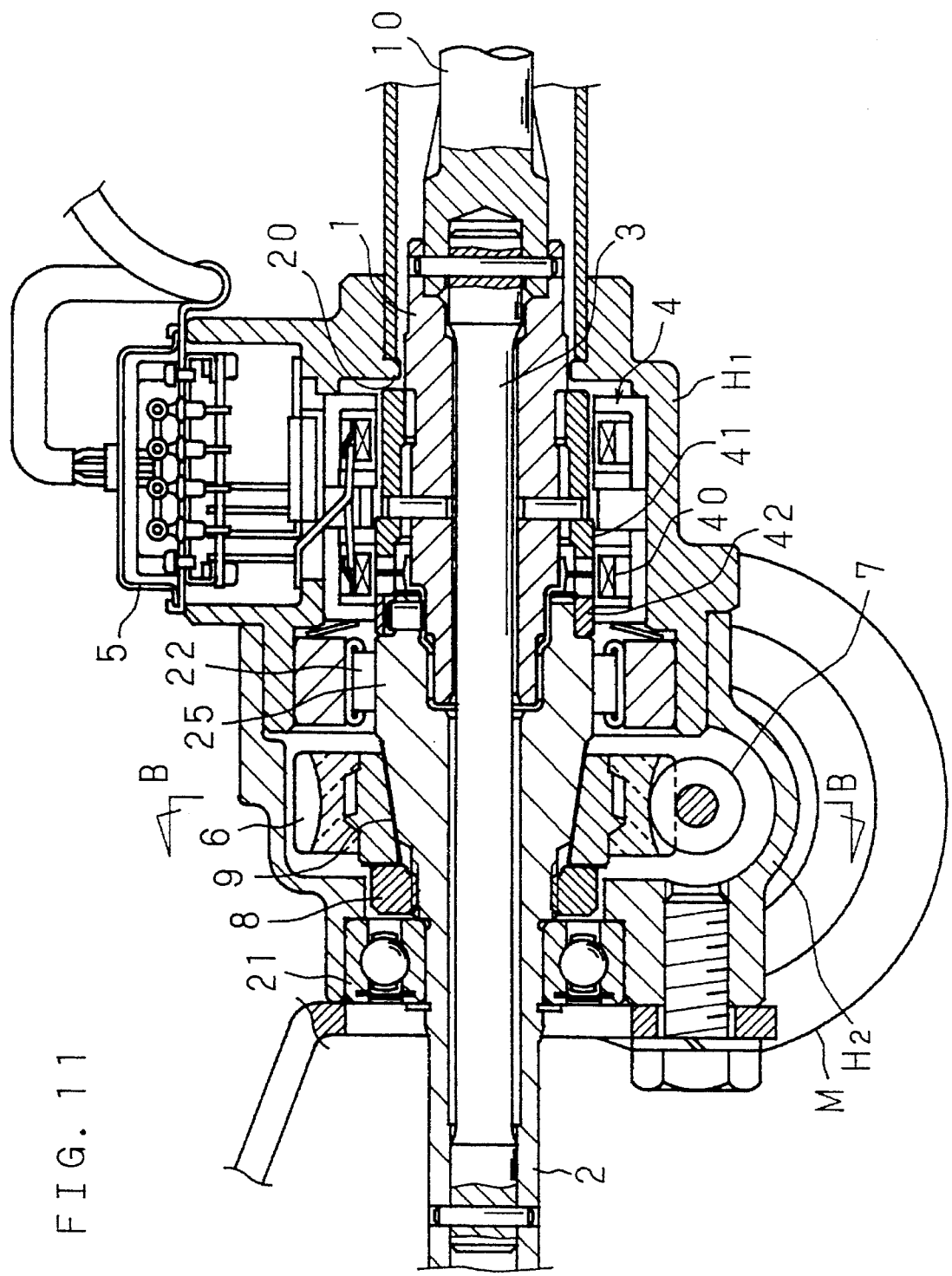
FIG. 11 is a longitudinal cross-sectional view showing essential portions of another power steering apparatus according to the invention.
Figure 12:
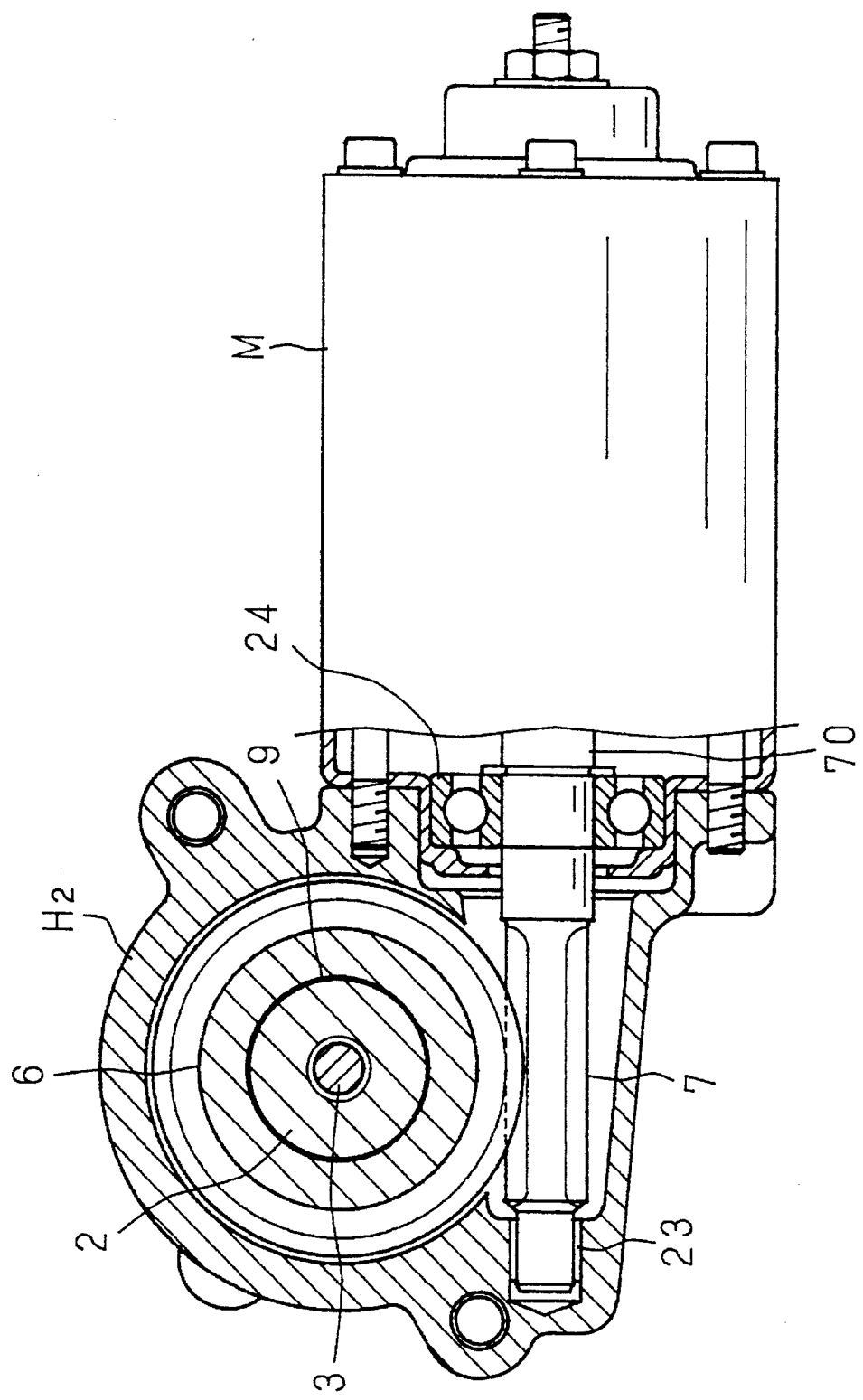
FIG. 12 is a transverse cross-sectional view, taken along line B—B in FIG. 11, showing a transmission system coupling from a steering assisting motor to an output shaft.

FIG. 11 is a longitudinal cross-sectional view showing essential portions of a power steering apparatus according to third and fourth embodiments of the invention, and FIG. 12 is a transverse cross-sectional view taken along line B—B in FIG. 11. In FIGS. 11 and 12, the same parts as those shown in FIGS. 1 and 2 are designated by the same reference numerals, and the description of such parts will not be repeated herein.

Figure 13:
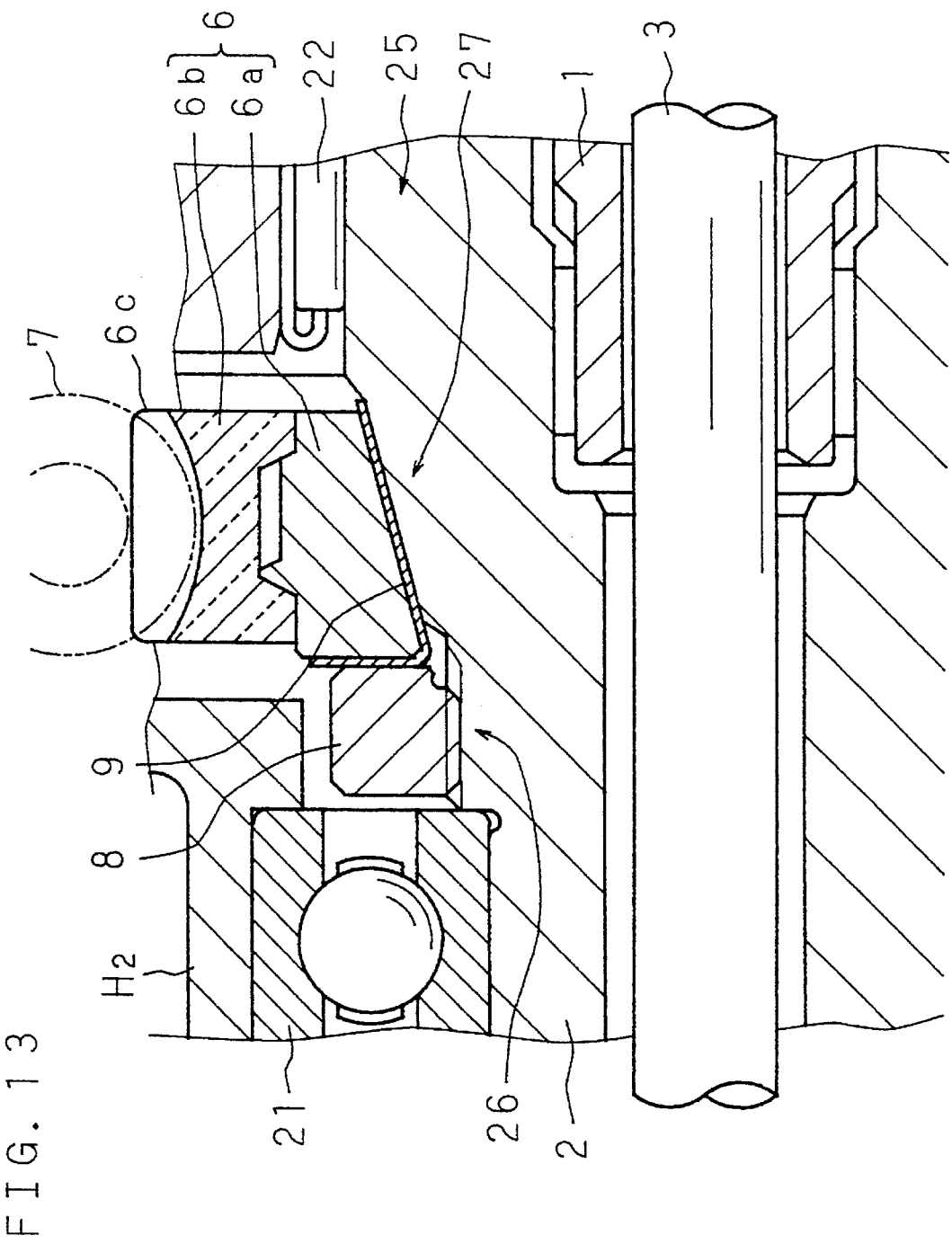
FIG. 13 is an enlarged cross-sectional view showing the portion that characterizes a third embodiment of the invention.
Figure 14:
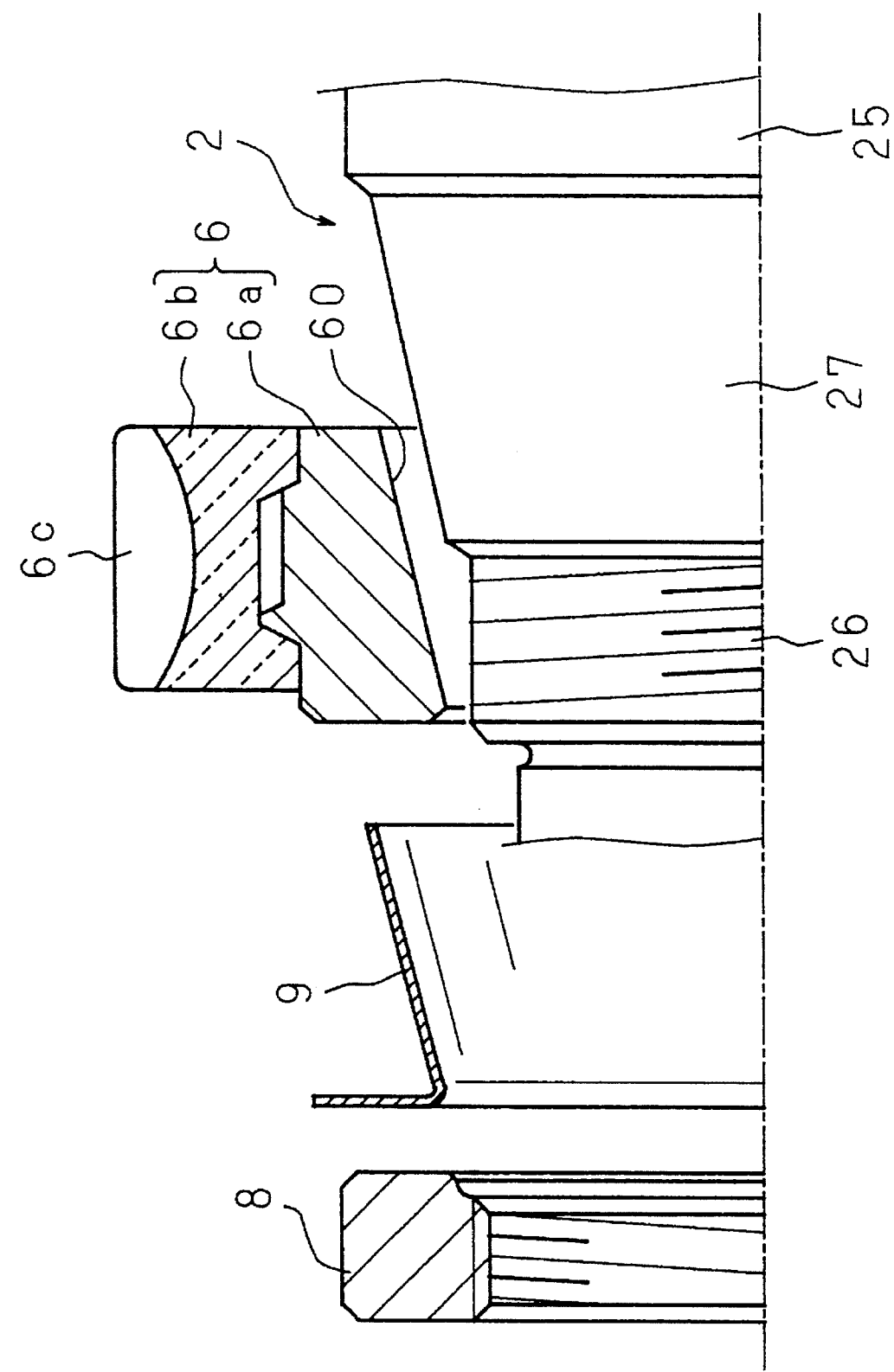
FIG. 14 is a diagram for explaining an assembling procedure for the portion that characterizes the third embodiment.

The construction of the power steering apparatus according to the third and fourth embodiments is fundamentally the same as that of the first embodiment, the difference being in the mounting construction for the worm wheel 6. FIG. 13 is an enlarged cross-sectional view showing the mounting position of the worm wheel 6 and its adjacent portions according to the third embodiment, and FIG. 14 is a diagram for explaining an assembling procedure for the worm wheel 6. As shown, the worm wheel 6 comprises a metal boss 6a and a plastic gear 6b formed integrally around the outer circumference of the boss 6a. Worm teeth 6c that engage with the worm 7 are cut in the outer circumference of the gear 6b. The boss 6a of the worm wheel 6 is an annular member having an fitting hole 60 opened through its axis across the thickness thereof. As shown in FIG. 14, the fitting hole 60 is formed as a tapered hole with its diameter linearly deceasing toward one end thereof in the axial direction.

The output shaft 2 on which the worm wheel 6 is to be mounted comprises a support portion 25 whose diameter is made larger at a portion supported by a needle-like roller bearing 22 than at other portions, and a threaded portion 26 formed on the outer circumference upwardly (to the right in the figure) of a portion supported by a ball bearing 21, these two portions 25, 26 being connected by a tapered portion 27 with linearly decreasing diameter from the former toward the latter. The slope of the tapered portion 27 is made to match that of the fitting hole 60.

The worm wheel 6 is mounted on the output shaft 2 in the following procedure. First, as shown in FIG. 14, the worm wheel 6 is fitted onto the output shaft 2 with the worm wheel 6 oriented so that the slope of the fitting hole 60 matches the slope of the tapered portion 27, and then, the lock nut 8 is screwed onto the output shaft 2 from under the worm wheel 6 and is made to engage with the threaded portion 26, the lock nut 8 being tightened with its upper end face contacting the lower end face of the worm wheel 6. The worm wheel 6 is fixed in place, as shown in FIG. 13, with the pressure exerted toward the larger diameter side of the fitting hole 6 by the tightening of the lock nut 8 being supported by the fitting faces on the inner circumference of the fitting hole 60 and the outer circumference of the tapered portion 27.

A slip plate 9 is interposed between the fitting faces of the tapered portion 27 and fitting hole 60 and between the contact faces of the lock nut 8 and worm wheel 6, so that the contact between these respective faces is accomplished via the slip plate 9 when the lock nut 8 is tightened. The rotation of the worm wheel 6 driven by the worm 7 is transmitted to the output shaft 2 by the friction occurring via the slip plate 9 between the fitting hole 60 and the tapered portion 27 and between the lower face of the worm wheel 6 and the end face of the lock nut 8.

The slip plate 9 is formed from the same material as the slip plate 9 in the first embodiment. As shown in FIG. 14, the slip plate 9 is formed in an annular shape that matches the slope of the fitting hole 60 and tapered portion 27, and has around the rim at one end thereof a jaw against which the end face of the lock nut 8 is made to abut. The slip plate 9 is first fitted on the fitting hole 60, and then fitted onto the tapered portion 27 together with the worm wheel 6. In this condition, the lock nut 8 is tightened to accomplish the mounting as described above.

When this slip plate 9 is fitted as described above, the frictional force occurring at the fitting faces of the fitting hole 60 and tapered portion 27 and at the contact faces of the lower face of the worm wheel 6 and the end face of the lock nut 8 is uniquely dependent on the bearing pressure at the slip plate 9 interposed between these faces, and this bearing pressure can be accurately set by adjusting the tightening torque of the lock nut 8, When the rotational torque corresponding to the thus set frictional force is applied to the worm wheel 6, slippage occurs on one surface or both surfaces of the slip plate 9, and the coupling between the worm wheel 6 and the output shaft 2 is disconnected, allowing free rotation of the output shaft 2.

More specifically, the bearing pressure applied to the slip plate 9 is set by adjusting the tightening torque of the lock nut 8 so that slippage occurs upon the application of a prescribed upper limit torque. This forms a mechanical torque limiter that is activated without fail at this upper limit torque. By determining the upper limit torque on the basis of the maximum torque that the steering assisting motor M can produce in normal operation, it is possible to prevent the occurrence of steering maneuverability loss resulting from a motor lock. Further, after the locked condition is released, the coupling between the worm wheel 6 and the output shaft 2 is restored by the friction of the slip plate 9, allowing the torque of the motor M to be transmitted to provide steering assisting power.

As described, with the tapered fitting hole 60 fitted on the tapered portion 27 of the output shaft 2, the worm wheel 6 is fixed in position by being held from both sides by the fitting faces and the lock nut 8. Accordingly, no deformation is caused in either axial or radial directions at any time including the above-described slipping situation, and engagement with the worm 7 is maintained in good condition at all times, so that there is no possibility of hindering the steering assisting operation. The slip plate 9 also serves as a spacer to fill the gap between the fitting hole 60 and the taper portion 27 and also to absorb machining errors on the inner circumferential surface of the fitting hole 60 or the outer circumferential surface of the tapered portion 27. Accordingly, by adjusting the thickness of the slip plate 9, the initial position of the worm wheel 6 that changes when the lock nut 8 is tightened can be optimized, thus preventing improper engagement with the worm 7 resulting from machining errors.

The third embodiment also includes a construction in which the slip plate 9 is not used so that the inner circumferential surface of the fitting hole 60 is made to directly contact the outer circumferential surface of the tapered portion 27 and the end face of the lock nut 8 to directly contact the side face of the worm wheel 6, the transmission to the output shaft 2 being accomplished by direct friction between these faces. With this construction, however, it is difficult to accurately grasp the frictional force acting at each contact face, and a certain degree of error is inevitable in the initial setting of the upper limit torque at which the torque limiter is activated.

In this embodiment, the lock nut 8 is formed from a single nut with threads formed to self-lock onto the threaded portion 26 to prevent positional displacement of the worm wheel 6 after it is tightened. Alternatively, a double-nut type lock nut may be used which has a pair of nuts that are screwed onto the threaded portion 26, one nut being tightened to press the worm wheel 6 whose position is then locked by tightening the other nut.

[Embodiment 4]

Figure 15:
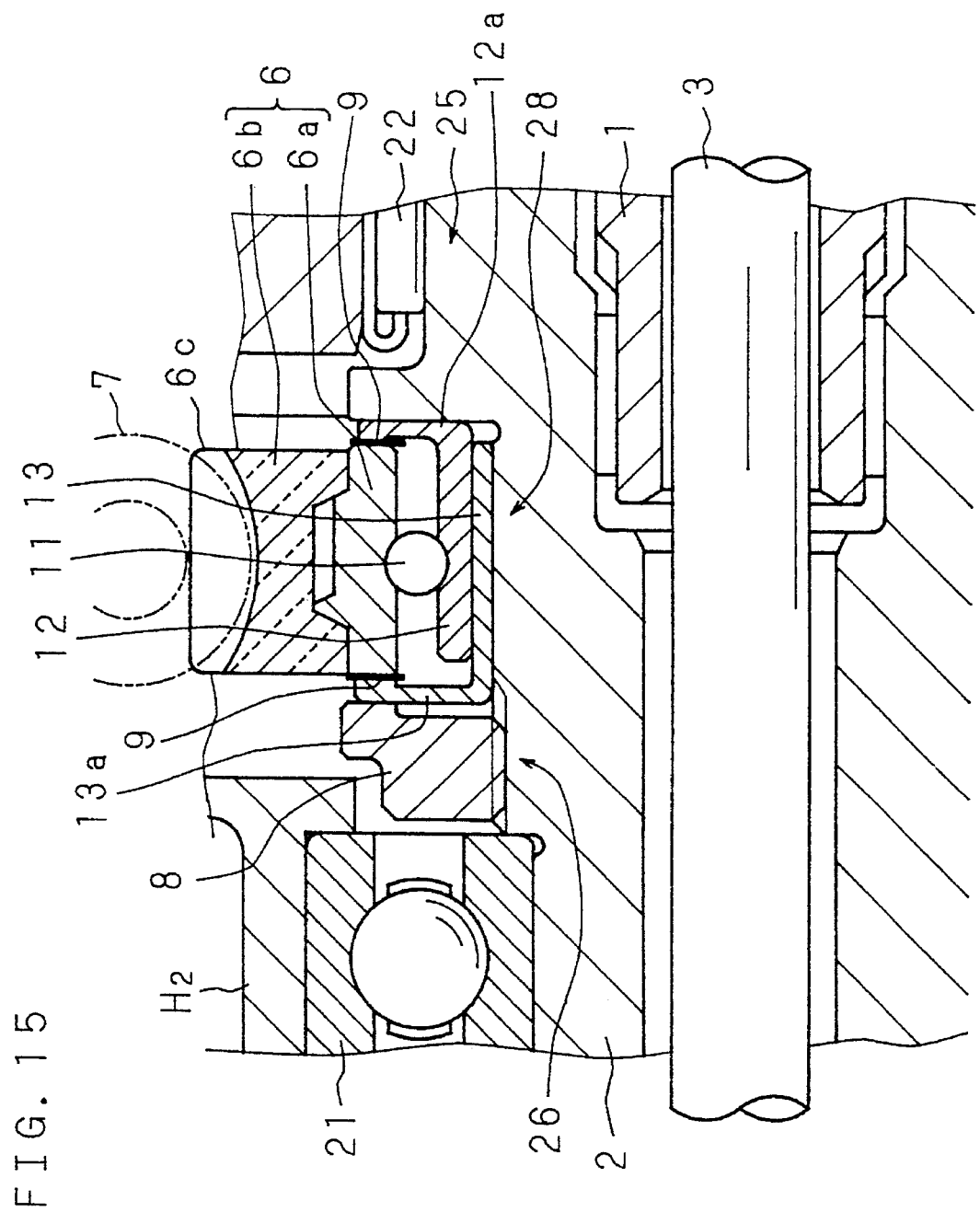
FIG. 15 is an enlarged cross-sectional view showing an example of the portion that characterizes a fourth embodiment of the invention.

FIG. 15 is an enlarged cross-sectional view showing the mounting construction for the worm wheel 6 in the power steering apparatus according to the fourth embodiment of the invention. The overall construction of the power steering apparatus is the same as that of the third embodiment shown in FIGS. 11 and 12; the difference from the third embodiment lies in the mounting position of the worm wheel 6, that is, the portion between the positions of the output shaft 2 supported by the ball bearing 21 and needle-like roller bearing 22 is not tapered like the previously described tapered portion 27, but is formed as a constant diameter portion 28 having an outer diameter substantially equal to that of the threaded portion 26. The worm wheel 6 has a plurality of spherical rolling member 11 (only one is shown) arranged in a circumferential direction and rolling on a raceway track formed around the inner circumference of the boss 6a, and is fitted onto the constant diameter portion 28 via an inner ring 12 that supports the rolling members 11 from the inside and a holding ring 13 that fits inside the inner ring 12. By tightening the lock nut 8 screwed on the threaded portion 26, the worm wheel 6 is held and fixed in position between the lock nut 8 and the support portion 25 supported by the needle-like roller bearing 22.

The inner ring 12 and the holding ring 13 are respectively provided with disc-shaped pressure flanges 12a and 13a extending radially and outwardly at opposite positions across the thickness thereof. The pressure flange 12a of the inner ring 12 is pressed between the upper side face of the boss 6a of the worm wheel 6 and the end face of the support portion 25 facing it, and the pressure flange 13a of the holding ring 13 between the lower side face of the boss 6a and the end face of the lock nut 8 facing it. Further, slip plates 9 formed from a material having a stable friction characteristic are interposed between the side faces of the boss 6a and the pressure flanges 12a, 13a, respectively.

More specifically, the worm wheel 6 is indirectly held and fixed as shown in position between the tightened lock nut 8 and the support portion 25 via the pressure flanges 12a and 13a contacting both sides of the boss 6a. The rotation of the worm wheel 6 driven by the worm 7 is transmitted to the output shaft 2 by the friction occurring between the boss 6a and the pressure flanges 12a, 13a via the slip plates 9 and 9.

The frictional force that acts as a medium for transmission to the output shaft 2 is uniquely dependent on the bearing pressure acting at the slip plates 9, and this bearing pressure can be accurately set by adjusting the tightening torque of the lock nut 8. When the rotational torque corresponding to the thus set frictional force is applied to the worm wheel 6, slippage occurs on one surface or both surfaces of the slip plates 9, 9 allowing free rotation of the output shaft 2 with the rolling members 11, 11, ... rolling between the inner ring 12 fitted to the output shaft 2 and the boss 6a of the worm wheel 6, thus forming a torque limiter that reliably shuts off the transmission to the output shaft 2 upon the application of a prescribed upper limit torque.

With the above construction, since, during the operation as a torque limiter, the output shaft 2 is allowed to rotate freely with the rolling motion of the rotating members 11, 11, ... interposed between the output shaft 2 and the worm wheel 6, the resistance occurring at this portion does not affect the magnitude of the upper limit torque, and in the event of the locking of the steering assisting motor M, manual steering can be accomplished by the application of a small steering torque, the resulting effect being increased safety in the event of steering maneuverability loss. Furthermore, since the worm wheel 6 is held and fixed in position at both sides of the boss 6a by the lock nut 8 and the support portion 25 and also supported on the outer circumference of the output shaft 2 by the rolling members 11, 11, ... , no deformation is caused in either axial or radial directions at any time including the above-described slipping situation, and engagement with the worm 7 can be maintained in good condition at all times, so that there is no possibility of hindering the steering assisting operation.

Figure 16:
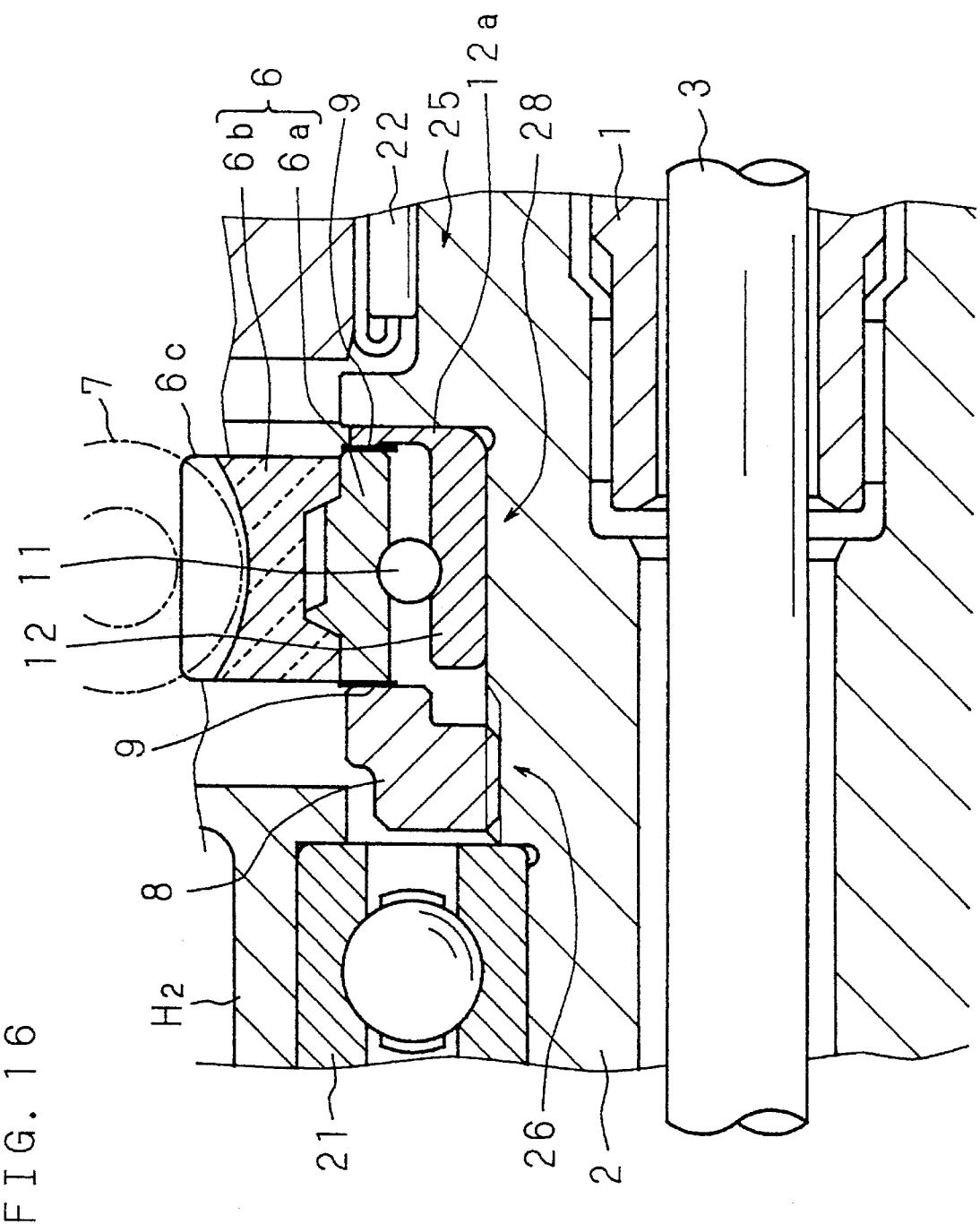
FIG. 16 is an enlarged cross-sectional view showing another example of the portion that characterizes the fourth embodiment.
Figure 17:
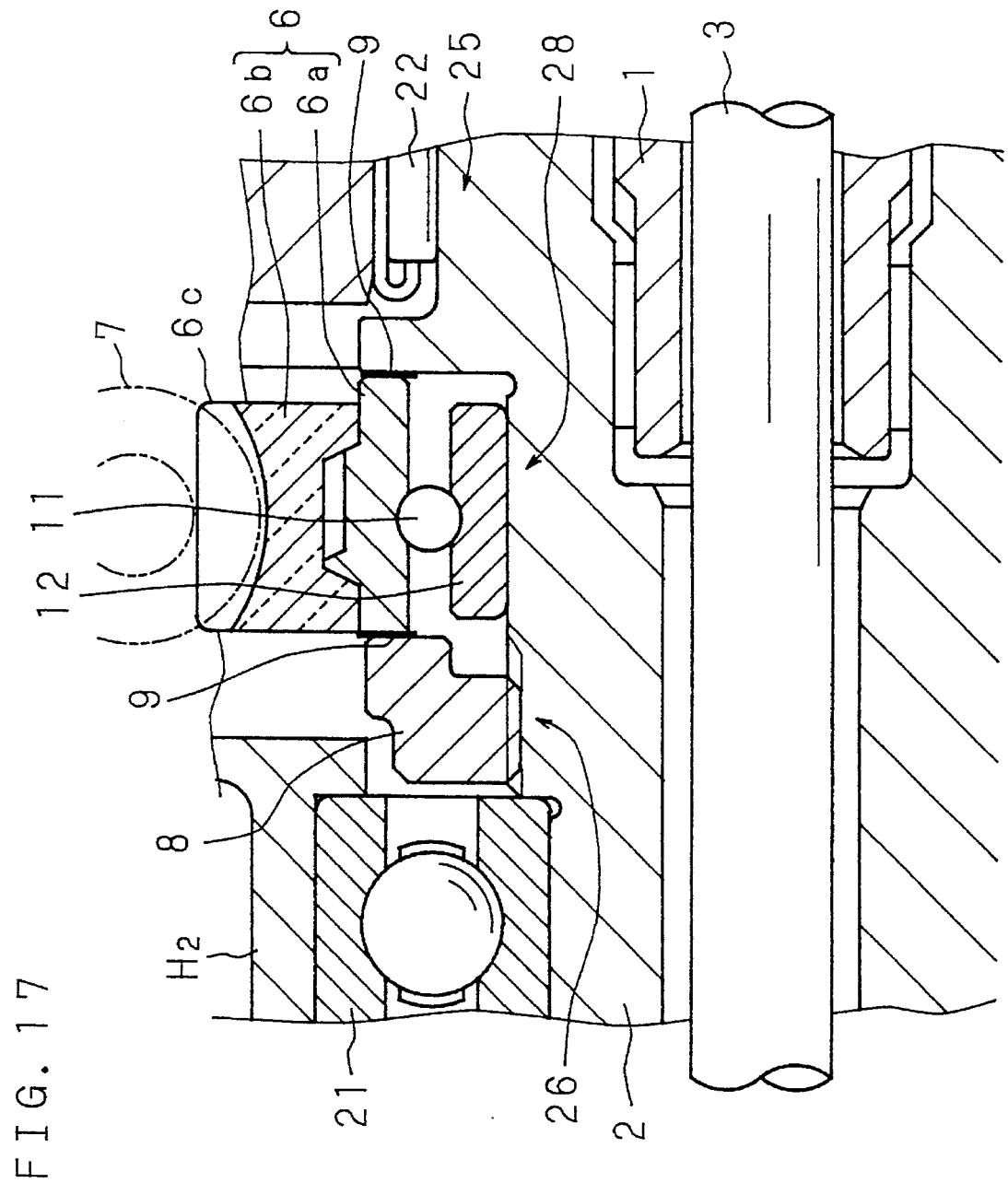
FIG. 17 is an enlarged cross-sectional view showing a further example of the portion that characterizes the fourth embodiment.

FIGS. 16 and 17 are enlarged cross-sectional views of essential portions illustrating other examples of the power steering apparatus of the fourth embodiment. In the embodiment shown in FIG. 15, the worm wheel 6 is held in position between the support portion 25 and the lock nut 8 via the pressure flanges 12a, 13a on both sides thereof. By contrast, in the embodiment shown in FIG. 16, the pressure flange 12a installed on the circumference of the inner ring 12 is disposed only on the side of the support portion 25, and the lock nut 8 and the worm wheel 6 are made to contact each other directly. In the embodiment shown in FIG. 17, the support portion 25 and the worm wheel 6 are also made to contact directly.

These constructions achieve a reduction in the number of parts by elimination of the holding ring 13 and a simplification in design of the inner ring 12, and provide the effect of simplifying the construction by elimination of the pressure flange 12a while retaining the earlier mentioned effect. However, in the construction of FIG. 16, the torque associated with the tightening of the lock nut 8 acts on the slip plate 9 placed between the lock nut 8 and the worm wheel 6, and in the construction of FIG. 17, the torque also acts on the slip plate 9 placed between the worm wheel 6 and the support portion 25. This affects the initial setting of the bearing pressure for the slip plate 9. This problem, however, can be alleviated by using a slip plate 9 having a slip face only on one side thereof and by placing the slip plate 9 with its slip face on the side contacting the lock nut 8 or the support portion 25, that is, on the side on which the torque associated with the tightening of the lock nut 8 acts.

The same problem also occurs in the construction shown in FIG. 13; in this case also, the problem can be alleviated by using a slip plate 9 having a slip face on the side contacting the lock nut 8, as described above. This problem can also be overcome by interposing a washer between the lock nut 8 and the slip plate 9 to prevent the rotation associated with the tightening of the lock nut 8 from acting directly on the slip plate 9, as in the construction shown in FIG. 15. In the embodiment shown in FIGS. 15 to 17, spherical rolling members 11 are used, but instead, rolling members 11 of various other shapes commonly used in roller bearings, such as cylindrical rollers, tapered rollers, needle-like rollers, etc. can be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
   steering assisting electric motor;
   worm directly connected to an output side of said electric motor;
   an output shaft connected to a steering mechanism of a vehicle;
   a lock nut screwed on an outer circumference of said output shaft;
   a worm wheel fitted on the outer circumference of said output shaft and installed coaxially therewith by tightening said lock nut, said worm wheel engaging with said worm; and
   a slip plate that, is interposed at least between contact faces of said worm wheel and said output shaft, and that causes stable slippage when a circumferential force exceeding a predetermined limit occurs between said faces.

2. An electric power steering apparatus, comprising:
   a steering assisting electric motor;
   a worm directly connected to an output side of said electric motor;
   an output shaft connected to a steering mechanism of a vehicle;
   a worm wheel installed coaxially with said output shaft and engaging with said worm;
   a lock nut having a nut portion that is screwed onto a threaded portion formed on an outer circumference of said output shaft, and a tapered portion formed integrally on the advancing side of said nut portion and whose outer diameter gradually decreases toward an forward end thereof;
   a tapered fitting hole which is formed through an axis of said worm wheel and to which the tapered portion of said lock nut is fitted; and
   a support portion for supporting said worm wheel against axial pressure being exerted thereon via fitting faces of said tapered portion and said fitting hole by the advancing motion of said lock nut.

3. A power steering apparatus according to claim 2, wherein
   said output shaft is mounted inside a compartment of said vehicle and is connected via a universal joint to said steering mechanism mounted outside the compartment.

4. A power steering apparatus according to claim 2, further comprising
   a slip plate that is interposed between fitting faces of said tapered portion and said fitting hole and also between contact faces of said worm wheel and said support portion, and that causes stable slippage when a circumferential force exceeding a predetermined limit occurs between said respective faces.

5. A power steering apparatus according to claim 2, wherein
   a gap for allowing for an inward elastic deformation of said tapered portion is provided between the outer circumference of said output shaft and the inner circumference of said tapered portion that is fitted onto said output shaft.

6. An electric power steering apparatus, comprising:
   a steering assisting electric motor;
   a worm directly connected to an output side of said electric motor;
   an output shaft connected to a steering mechanism of a vehicle;
   a worm wheel installed coaxially with said output shaft and engaging with said worm;
   a lock nut screwed on a threaded portion on an outer circumference of said output shaft;
   a tapered ring fitted on said output shaft on the advancing side of said lock nut, and whose outer diameter gradually decreases in the advancing direction;
   tapered fitting hole which is formed through an axis of said worm wheel and to which said tapered ring is fitted; and
   a support portion for supporting said worm wheel against axial pressure which is exerted thereon via fitting faces of said tapered ring and said fitting hole by the advancing motion of said lock nut.

7. A power steering apparatus according to claim 6, wherein said output shaft is mounted inside a compartment of said vehicle and is connected via a universal joint to said steering mechanism mounted outside the compartment.

8. A power steering apparatus according to claim 6, further comprising a slip plate that is interposed between fitting faces of said tapered ring and said fitting hole and also between contact faces of said worm wheel and said support portion, and that causes stable slippage when a circumferential force exceeding a predetermined limit occurs between said respective faces.

9. A power steering apparatus according to claim 6, wherein a gap for allowing for an inward elastic deformation of said tapered ring is provided between said tapered ring and the outer circumference of said output shaft.

10. An electric power steering apparatus, comprising:

a steering assisting electric motor;

a worm directly connected to an output side of said electric motor;

an output shaft connected to a steering mechanism of a vehicle;

a worm wheel installed coaxially with said output shaft and engaging with said worm;

a tapered portion formed on an outer circumference of said output shaft and whose diameter gradually decreases toward one end thereof in an axial direction;

threaded portion formed integrally on the outer circumference of said output shaft on the smaller diameter side of said tapered portion;

tapered fit, ting hole formed through an axis of said worm wheel and having a tapered shape that matches said tapered portion; and a lock nut screwed on said threaded portion, wherein said worm wheel is fitted on said tapered portion via said fitting hole, and is clamped in position with the pressure exerted toward the larger diameter side thereof by the tightening of said lock nut being supported by fitting faces of said tapered portion and said fitting hole.

11. A power steering apparatus according to claim 10, further comprising a slip plate that is interposed between fitting faces of said tapered portion and said fitting hole and also between contact faces of said worm wheel and said lock nut, and that causes stable slippage when a circumferential force exceeding a predetermined limit occurs between said respective faces.

12. An electric power steering apparatus, comprising:

a steering assisting electric motor;

a worm directly connected to an output side of said electric motor;

an output shaft connected to a steering mechanism of a vehicle; and a worm wheel installed coaxially with said output shaft and engaging with said worm, wherein said worm wheel is fitted to an outer circumference of said output shaft via a plurality of rolling members arranged circumferentially, and by tightening a lock nut that is screwed onto one end of a fitting portion of said output shaft, said worm wheel is held in position between said lock nut and a support portion formed on the other end of the fitting portion.

13. A power steering apparatus according to claim 12, further comprising slip plates that are respectively interposed between contact faces of said worm wheel and said lock nut and between contact faces of said worm wheel and said support portion, and that cause stable slippage when a circumferential force exceeding a predetermined limit occurs between said respective faces.

* * * * *

UNITED STATES PATENT AND TRADEMARK OFFICE
CERTIFICATE OF CORRECTION

PATENT NO. : 5,482,128
DATED : January 9, 1996
INVENTOR(S) : Manabu TAKAOKA et al.

It is certified that error appears in the above-indentified patent and that said Letters Patent is hereby corrected as shown below:

```
       Item [22],
    On the  Title  page of the patent, Foreign

Application Priority Data, change line 1 from "Dec. 7, 1993 [JP] Japan ........ 6-017485"

to -- Feb. 14, 1994 [JP] Japan ........ 6-017485 --;

and change line 3 from "Feb. 14, 1994 [JP] Japan ........ 5-327933"

to -- Dec. 24, 1993 [JP] Japan ........ 5-327933 --.
```

Signed and Sealed this

Seventh Day of May, 1996

Attest:

BRUCE LEHMAN

*Attesting Officer*  *Commissioner of Patents and Trademarks*